US012065307B2

(12) United States Patent
Morand

(10) Patent No.: US 12,065,307 B2
(45) Date of Patent: Aug. 20, 2024

(54) WASTE DISPOSAL DEVICE AND FILM DISPENSING CASSETTE

(71) Applicant: INTERNATIONAL REFILLS COMPANY LTD, Christ Church (BB)

(72) Inventor: Michel Morand, Verdun (CA)

(73) Assignee: INTERNATIONAL REFILLS COMPANY LTD, Christ Church (BB)

( * ) Notice: Subject to any disclaimer, the term of this patent is extended or adjusted under 35 U.S.C. 154(b) by 335 days.

(21) Appl. No.: 17/277,361

(22) PCT Filed: Sep. 20, 2019

(86) PCT No.: PCT/CA2019/051346
§ 371 (c)(1),
(2) Date: Mar. 18, 2021

(87) PCT Pub. No.: WO2020/056523
PCT Pub. Date: Mar. 26, 2020

(65) Prior Publication Data
US 2021/0354912 A1 Nov. 18, 2021

Related U.S. Application Data

(60) Provisional application No. 62/734,008, filed on Sep. 20, 2018.

(51) Int. Cl.
*B65F 1/06* (2006.01)
*B65F 1/16* (2006.01)
*B65H 16/06* (2006.01)

(52) U.S. Cl.
CPC .............. *B65F 1/062* (2013.01); *B65F 1/163* (2013.01); *B65F 1/1646* (2013.01); *B65H 16/06* (2013.01); *B65H 2701/191* (2013.01)

(58) Field of Classification Search
CPC .. B65F 1/062; B65F 1/06; B65F 1/163; B65F 1/1646; B65F 1/12; B65H 16/06; B65H 2701/191
(Continued)

(56) References Cited

U.S. PATENT DOCUMENTS 5,295,607 A 3/1994 Chang
5,322,179 A 6/1994 Ting
(Continued)

FOREIGN PATENT DOCUMENTS

CN 206345286 U 7/2017
JP 4894164 11/1973
(Continued)

OTHER PUBLICATIONS

European Search Report for corresponding application EP 19 86 3173; Report dated Apr. 28, 2022.
(Continued)

*Primary Examiner* — Nathan J Jenness
*Assistant Examiner* — Elizabeth J Volz
(74) *Attorney, Agent, or Firm* — CANTOR COLBURN LLP

(57) ABSTRACT

A waste disposal device has a container having an opening at a top end, the container defining an inner cavity accessible through the opening. A bag interface at the opening is adapted to hold a bag opened at the opening of the container with a closed end of the bag extending in the inner cavity. A pair of doors is pivotally connected to the container to open and close access through the opening and adapted to close off a portion of the bag passing therebetween, the doors being pivotable from a closed position in which the doors meet to close the access through the opening, to a first pivoted position in which the doors are pivoted away from the inner cavity. One or both doors is or are pivotable to a
(Continued)

second pivoted position toward the inner cavity. An actuation mechanism biases the door(s) to the closed position.

19 Claims, 29 Drawing Sheets

(58) Field of Classification Search
USPC ...... 220/495.06, 495.07, 908.1, 495.08, 908, 220/262, 263, 264, 825, 826
See application file for complete search history.

(56) References Cited

U.S. PATENT DOCUMENTS

| | | | | |
|---|---|---|---|---|
| 5,505,334 | A | 4/1996 | Triglia | |
| 5,738,239 | A | 4/1998 | Triglia | |
| 6,199,714 | B1 | 3/2001 | Thompson | |
| 7,168,591 | B1 * | 1/2007 | Miller | B65F 1/062 220/495.07 |
| 2003/0201267 | A1 * | 10/2003 | Yang | B65F 1/163 220/826 |
| 2007/0145057 | A1 | 6/2007 | Nance | |
| 2009/0126320 | A1 | 5/2009 | Rousso | |
| 2011/0309082 | A1 | 12/2011 | Morand | |
| 2015/0001219 | A1 | 1/2015 | Hess | |
| 2015/0021334 | A1 | 1/2015 | Morand | |

FOREIGN PATENT DOCUMENTS

| | | | | |
|---|---|---|---|---|
| JP | 48094164 | * | 11/1973 | |
| JP | 761503 | * | 3/1995 | B65F 1/06 |
| JP | 761503 | A | 3/1995 | |
| JP | 2015510858 | A | 4/2015 | |
| KR | 1020120097538 | A | 9/2012 | |
| WO | 2011011895 | A1 | 2/2011 | |
| WO | 2018107179 | A1 | 6/2018 | |
| WO | 2020056523 | A1 | 3/2020 | |

OTHER PUBLICATIONS

International Search Report for corresponding application PCT/CA2019/051346 filed Sep. 20, 2019; Mail date Nov. 27, 2019.

Written Opinion for the International Searching Authority for corresponding application PCT/CA2019/051346 filed Sep. 20, 2019; Mail date Nov. 27, 2019.

Japanese Office Action for corresponding application 2021-515519; Report dated Jul. 31, 2023.

Third Party Observation for corresponding application No. 10-2021-7011403, dated Sep. 20, 2019; Filed Apr. 23, 2024.

* cited by examiner

WASTE DISPOSAL DEVICE AND FILM DISPENSING CASSETTE

FIELD OF THE APPLICATION

The present application relates to a film dispensing cassette of the type used with a waste disposal device and, more particularly but not exclusively, to a film dispensing cassette and waste disposal device for the disposal of odorous waste, such as diapers and litter.

BACKGROUND OF THE ART

Waste disposal devices having odor-concealing systems with film dispensing cassettes are well known. Such waste disposal devices typically comprise a bag that is closed off by given mechanisms, to conceal the odors within the bag. U.S. Pat. No. 6,817,164 (Mauffette et al.) and U.S. Pat. No. 7,406,814 (Morand) propose such odor-concealing systems. However, it is desired to provide a waste disposal device that is simple in construction, and that may have the option of being opened by a pedal.

SUMMARY OF THE APPLICATION

It is therefore an aim of the present disclosure to provide a novel waste disposal device.

It is therefore an aim of the present disclosure to provide a novel film dispensing cassette for waste disposal device.

It is a further aim of the present disclosure to provide a novel assembly of film dispensing cassette and waste disposal device.

Therefore, in accordance with an embodiment of the present disclosure, there is provided a waste disposal device comprising: a container having an opening at a top end, the container defining an inner cavity accessible through the opening, a bag interface at the opening adapted to hold a bag opened at the opening of the container with a closed end of the bag extending in the inner cavity; a pair of doors pivotally connected to the container to open and close access through the opening and adapted to close off a portion of the bag passing therebetween, the doors being pivotable from a closed position in which the doors meet to close the access through the opening, to a first pivoted position in which the doors are pivoted away from the inner cavity, and wherein at least one of the doors is pivotable to a second pivoted position toward the inner cavity; and an actuation mechanism operatively connected to at least one of the doors to bias the at least one of the doors to the closed position.

Further in accordance with the embodiment, for instance, a lid may be pivotably mounted to the container to expose or conceal the doors.

Still further in accordance with the embodiment, for instance, the actuation mechanism has a pedal actuatable by a user, the actuation mechanism comprising a link assembly interfacing the pedal and to the lid to open/close the lid.

Still further in accordance with the embodiment, for instance, the link assembly blocks at least one of the doors from pivoting to the first pivoted position when the pedal is pressed.

Still further in accordance with the embodiment, for instance, the link assembly has a first link translating in a generally vertical direction in the inner cavity, the first link having a top pushing end contacting the lid to displace the lid to open access to the opening.

Still further in accordance with the embodiment, for instance, the first link is pivotally connected to the pedal.

Still further in accordance with the embodiment, for instance, a second link is connected to the first link by a joint providing a rotational degree of freedom and a translational degree of freedom, the second link being pivotally connected to one of the doors.

Still further in accordance with the embodiment, for instance, the joint is at least one set of follower and guide slot.

Still further in accordance with the embodiment, for instance, the first link has a two-pronged end contacting the lid.

Still further in accordance with the embodiment, for instance, at least one biasing unit biasing the link assembly to a downwardmost position to keep the doors in the closed position.

Still further in accordance with the embodiment, for instance, the container comprises a top portion and a base portion, the top portion being separated from the base portion for access to the inner cavity of the container.

Still further in accordance with the embodiment, for instance, the base portion defines at least one cassette compartment adapted to receive a cassette dispending a roll of bags.

Still further in accordance with the embodiment, for instance, one of the cassette is present.

Still further in accordance with the embodiment, for instance, the base portion has a releasable connection for the cassette in the compartment.

Still further in accordance with the embodiment, for instance, a periphery of the opening has an abutment blocking one of the doors from moving to the second pivoted position.

Still further in accordance with the embodiment, for instance, a biasing member may bias one of the doors toward the closed position from the first pivoted position.

Still further in accordance with the embodiment, for instance, the interface is at least one collar.

Still further in accordance with the embodiment, for instance, at least one hook is on the at least one collar and faces outwardly.

Still further in accordance with the embodiment, for instance, two of said collar are present and are on opposite sides of the opening.

In accordance with another embodiment of the present disclosure, there is provided a cassette for dispensing film comprising a casing having an opening, plain bearing supports and a deformable wall opposite the opening, a shaft rotatably supported by the plain bearing supports, and a roll of film rolled onto the shaft with a free end of the roll of film dispensable through the opening, wherein the shaft, the plain bearing supports and the deformable wall concurrently form a brace providing flexural stiffness to the cassette, and wherein the shaft separates or collapses when the roll of film is dispensed off of the shaft to lessen the flexural stiffness of the cassette.

DESCRIPTION OF THE PREFERRED EMBODIMENTS

Figure 1:
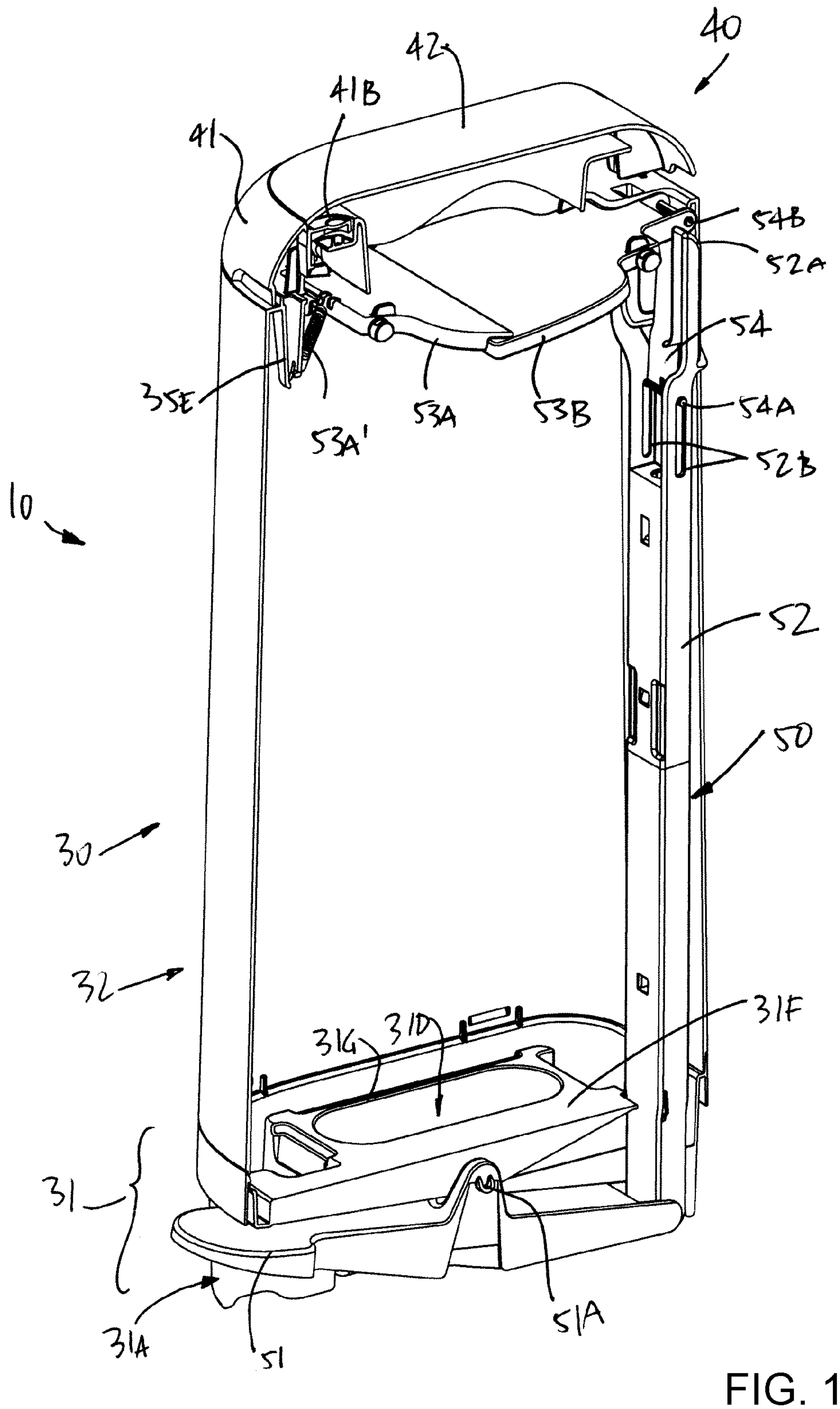
FIG. 1 is a partly sectioned perspective view of an assembly of a film dispensing cassette and waste disposal device in accordance with an embodiment of the present disclosure.
Figure 2:
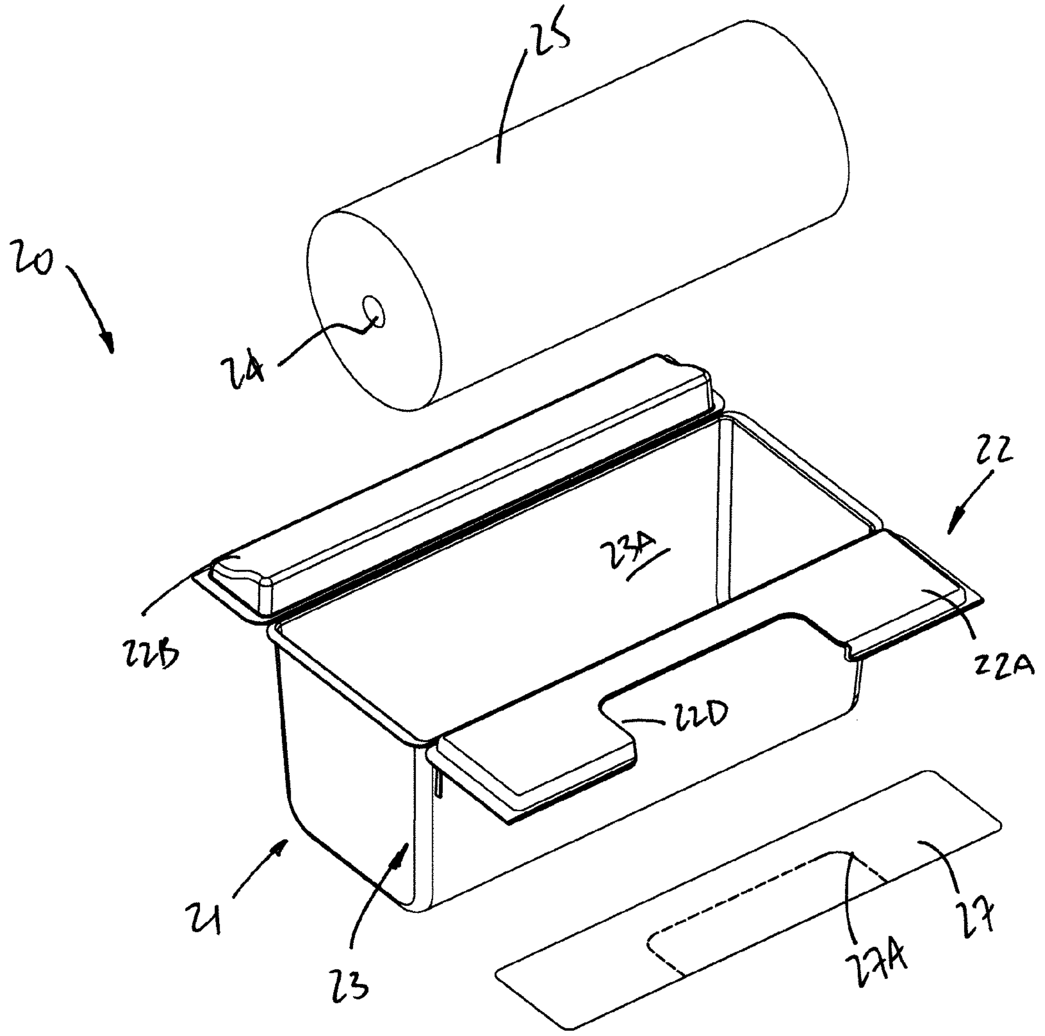
FIG. 2 is an assembly view of the film dispensing cassette of FIG. 1, with a tear-off membrane.

Referring to the drawings and more particularly to FIG. 1, a waste disposal device (hereinafter "device") is generally shown at 10. The device 10 may be known as a garbage, a pail, a garbage pail, a trash, etc. The device 10 may be used with any suitable type of waste, including diapers, soiled litter, foodstuff, etc. The device 10 is of the type using a film dispensing cassette 20 (hereinafter "cassette" 20) dispensing film that may form a tubular bag (FIG. 2). Any other suitable type of bag dispenser may be used as well with the device 10. Moreover, the expression cassette is one among others to describe item 20, with other expressions including cartridge, refill, etc. The device 10 has a container 30, a lid assembly 40 and an actuation mechanism 50.

The container 30 forms the structure of the device 10, and accommodates and conceals the tubular bag containing waste. The container 30 is not limited to the shape illustrated in the Figs. Any suitable geometry is considered as well.

The lid assembly 40 opens and closes a top opening of the container 30, through which the waste is thrown into the bag supported by the device 10.

The actuation mechanism 50 is manually (e.g., by foot) actuated to open and close the lid assembly 40, and to interact with a pair of jaws that close off the bag to seal odors therein. The jaws may be arranged to ensure that the bag is closed when the lid of the lid assembly 40 is closed.

Figure 3:
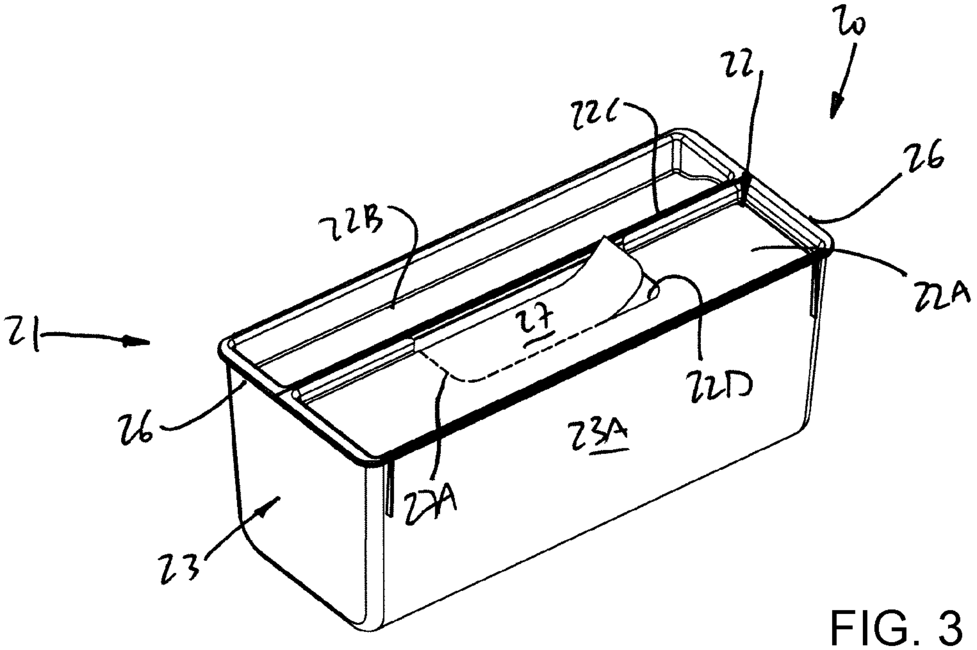
FIG. 3 is a perspective view of the film dispensing cassette of FIG. 2, with the tear-off membrane being removed.
Figure 4:
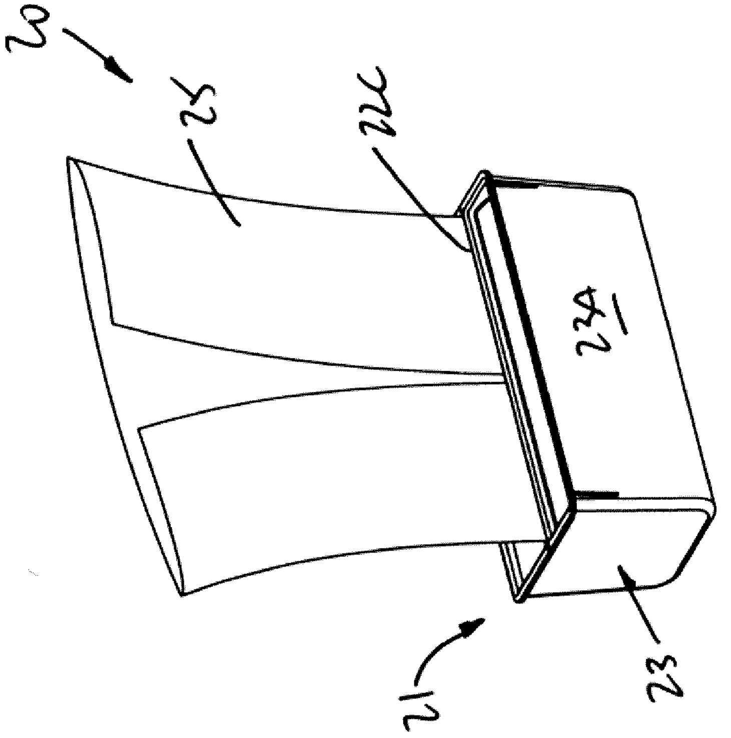
FIG. 4 is a perspective view of the film dispensing cassette of FIG. 2, with film projecting out.
Figure 12:
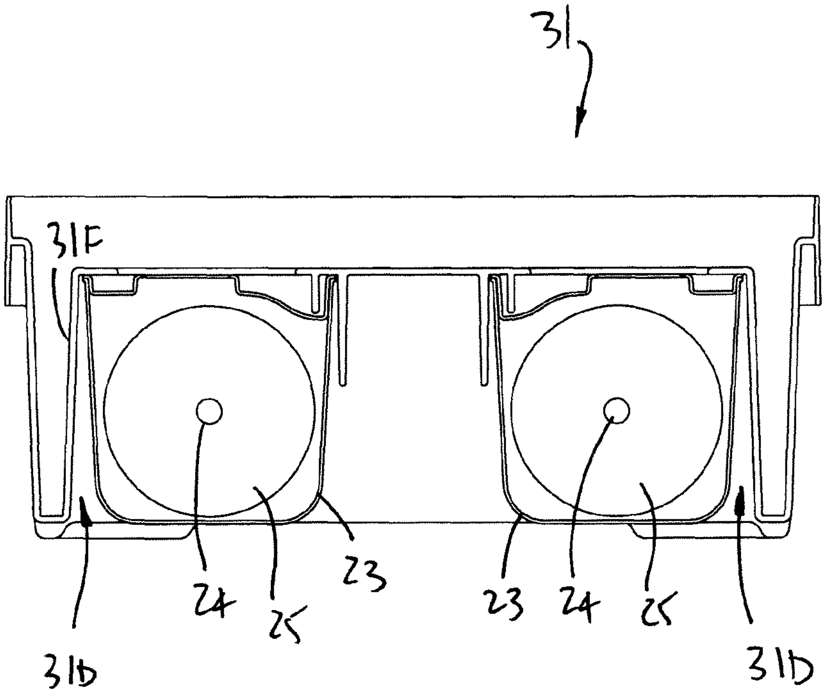
FIG. 12 is a sectional view of the pair of the film dispensing cassettes installed into the waste disposal device as in FIG. 11.

Referring to FIGS. 2 to 4, the cassette 20 is shown in greater details, with parts thereof shown in the 20*s*. The cassette 20 has a casing 21 or body, having an elongated shape. The casing 21 may consist of one or more pieces interconnected to one another. In the illustrated embodiment, the casing 21 has a cover 22 and a receptacle 23. The cover 22 is generally the top part of the cassette 20 when used as described herein, whereas the receptacle 23 is the bottom part of the cassette 20 when used. However, in storage, shelving, the cassette 20 may be upside down, i.e., the cover 22 may be at the bottom while the receptacle 23 may be the top portion. In an embodiment, the cover 22 is made of a pair of panels 22A and 22B. The panels 22A and 22B may be flat, though this is optional. As seen in FIG. 3 and FIG. 12, the panel 22B may be concave from the exterior to define an inward abutment formation. The inward abutment formation may define an edge that catches the roll 25 when film is pulled out of the cassette 20, as detailed below. If a pair of panels 22A and 22B is present, a slit 22C (a.k.a., channel, elongated opening) may be defined between them for film to escape from an interior of the casing 21. An opening 22D is also defined between the panels 22A and 22B, for example large enough to allow one's fingers from picking a free end of the film 25. In an embodiment, the cover 22 may be an integrally formed monolithic piece as well, as an alternative to having the panels 22A and 22B. In an embodiment, the panels 22A and 22B are molded with the receptacle 23 in such a way that living hinges are formed at the junction between the panels 22A and 22B and the receptacle 23. This may allow for film, such as in a roll, to be inserted in the inner cavity of the casing 21. The panels 22A and 22B may then be closed to the arrangement of FIG. 2, and fixed to the receptacle 23 (to block movement at the living hinges). Ultrasound welding, gluing, welding, soldering, are options to fix the panels 22A and 22B to the receptacle 23. As illustrated in FIG. 4, the film 35 may pass through the slit 22C, but it may also pass instead solely through the opening 22D. The cassette 20 may be with only one of the slit 22C and opening 22D, and not both. If there is no opening 22D to grasp the film 25, a free end thereof may be prearranged to project out of the casing 21 through the slit 22C.

Still referring to FIGS. 2-4 the receptacle 23 forms the inner cavity of the casing 21 by its hollow shape. The receptacle 23 has a wall 23A that forms most of the exposed peripheral surfacing of the cassette 20, with the cover 22. The receptacle 23 may define plain journal bearings, though not shown.

Referring to FIG. 2, a shaft 24 supporting a roll of bags or film 25 is shown as being free to rotate inside the casing 21. The shaft 24 may also be called a core. The shaft 24 may be a hollow tube or rod, of any appropriate cross-section. For example, the shaft 24 is made of plastic, cardboard, etc. In another embodiment, the film 25 is rolled onto itself, without any shaft 24. The expressions films, bags, tube, etc may be used to describe the roll 25. According to an embodiment, the roll 25 has bags made of tubular film connected end to end, with a free end of the roll 25 being defined by an open end of the bags. As seen hereinafter, the cassette 20 may be located in a bottom of the device 10, with the film of the roll 25 pulled upwardly and hung open to a top of the device 10, while remaining connected to a remainder of the roll 25. The other end of the roll 25 is wrapped onto the shaft 24 (if present). The other end of the roll 25 may be unconnected to the shaft 24. Retaining means may be present for the other end of the roll 25 to be attached to the shaft 24, such as an adhesive, tape, or a slit or grippers on the shaft 24. The cassette 20 may be provided without the roll 25 of bags, with a user opening the casing 21 to insert a replacement roll 25 of bags.

Referring to FIGS. 2 to 4, the cassette 20 may have a rim 26. The rim 26 is formed at the periphery of the cassette 20, such as the top periphery when the cassette 20 is used. The rim 26 may consist of a portion of the cover 22 extending beyond the receptacle 23. Alternatively, the rim 26 may consist of a flange portion of the receptacle 23 extending beyond the cover 22. As shown in FIGS. 2 to 5, the rim 26 may be a combination of both a portion of the cover 22 and a flange at a bottom of the receptacle 23. The rim 26 may have numerous segments, continuous or discontinuous around the casing 21, though shown as being continuous. The rim 26 may also be known referred to as a shoulder(s), a flange, a lip, a strip, etc.

Referring to FIG. 2, the cassette 20 may have a cover flap 27, protecting the opening 22D. The cover flap 27 may be defined by the cover 22 and/or by a wrapping. In an embodiment, part of the cover flap 27 may be torn off from a remainder of the cover 22. For this purpose, a tear line 27A may delimit the flap 27 relative to a remainder of the cover 22 (e.g., one or of the panels 22A and 22B). The tear line may be a thinner web in the wall of the cover 22, or a series of perforations, facilitating detachment of the flap 27. According to an embodiment, a window may be present for a user to grab the flap 27. In another embodiment, there is no door, with the wall of the cover 22 simply being opened at opening 22D. Another component may alternatively be present to temporarily close off the opening (e.g., in the absence of a door), such as a label, plastic film, wrapping, etc. For example, inner mold labelling (IML) material wraps the casing 21, and forms the flap 27 covering at least a portion of the opening 22D. The IML material 27 may have the predefined tear strip 27A therein, in register with the opening 22D, for being torn off and allow access to the film 25. In an embodiment, the cover 22 and the receptacle 23 may be an integrally formed monolithic piece including including the flap 27 (if present). The IML material may be comolded with the monolithic piece, or may even be regarded as contributing to the monolithic nature as the IML material is integral with the cover 22 and the receptacle 23.

Now that the cassette 20 has been described, a deployment of the film from the cassette 20 is set forth. If the cassette 20 comes with the flap 27 or with wrapping or like membrane (e.g., IML material) covering the opening 22D as in FIG. 2, the flap 27, wrapping or membrane is removed, to expose an interior of the cassette 20, and more particularly the film 25. The free end of film 25 may be connected (e.g., taped) to the flap 27, wrapping or membrane such that the free end of film 25 is pulled along. The free end of the film 25 may then be out of the casing 21, via slit 22C and/or opening 22D, in the manner shown in FIG. 4, such that the film may be pulled out of the casing 21 while the rest of the film 25 remains in the casing 21. As shown in FIG. 4, the film 25 may be a folded roll of film, with two fold lines being present as an example. The free end of the film 25 is the open end. As shown in FIG. 12, the cassette 20 may be oriented for the inward abutment formation to be oppose to the direction of exit of the film 25. For example, in FIG. 12, the film 25 is pulled from a more central location (between the two cassettes 20). Accordingly, the roll 2 may be forced against the inward abutment formation when pulled. The inward abutment formation may act as a deflector, forcing the film out of the roll 25 before exiting through the slit 22C.

Referring to FIGS. 1 and 10-12, the container 30 may have a base portion 31 and a top portion 32, that may or may not be separable to provide access to an interior of the container 30. The base portion 31 sits on the ground or floor when the device 10 is used. An opening 31A may be located in an outer surface of the base portion 31, such that a pedal of the actuation mechanism 50 may project out of the opening 31A. The opening 31A opens into a cavity 31B that operatively accommodates the pedal of the actuation mechanism 50. For the pedal to be pivotally supported, as being seen in FIG. 10, the base portion 31 may have pivot supports 31C (one shown, but with the base portion 31 having a symmetry plane passing through it in an embodiment). Hence, a mirrored pivot support may be present, for the pivot supports 31C to act as plain bearings, as one possible embodiment. The pivot supports 31C may be part of a mount 31D receiving thereon the cassette 20 and pedal. The various components of the base portion 31A may be integrally molded into a single piece, or may be constituted of numerous pieces.

The base portion 31 may also include one or more compartments 31D (two shown) to receive cassettes 20 therein. The compartments 31D may form a frame 31F to receive and releasably support the cassette(s) 20. For example, cantilevered arms 31E may form a snap fit arrangement to retain cassettes via the rim 26. A manual pressure on the arms 31E may suffice in releasing the cassette 20 from the base portion 31. One or more of such arms 31E may be present. The compartments 31D may be accessible via an underside of the base portion 31 (FIG. 10), with a window 31G being present to allow the film to be deployed into the interior of the container 30 (FIG. 11). The cassettes 20 may be side by side with the cassettes 20 being parallel (e.g., the rotational axes of the rolls 25).

The container 30 may also be a single tubular unit. Other constructions are contemplated, for instance a tube or sleeve of fabric or paneling over structural beams. An opening 33 is at a top of the container 30. The opening 33 provides access to an interior of the container 30, for the disposal of waste in the bag.

Figure 5:
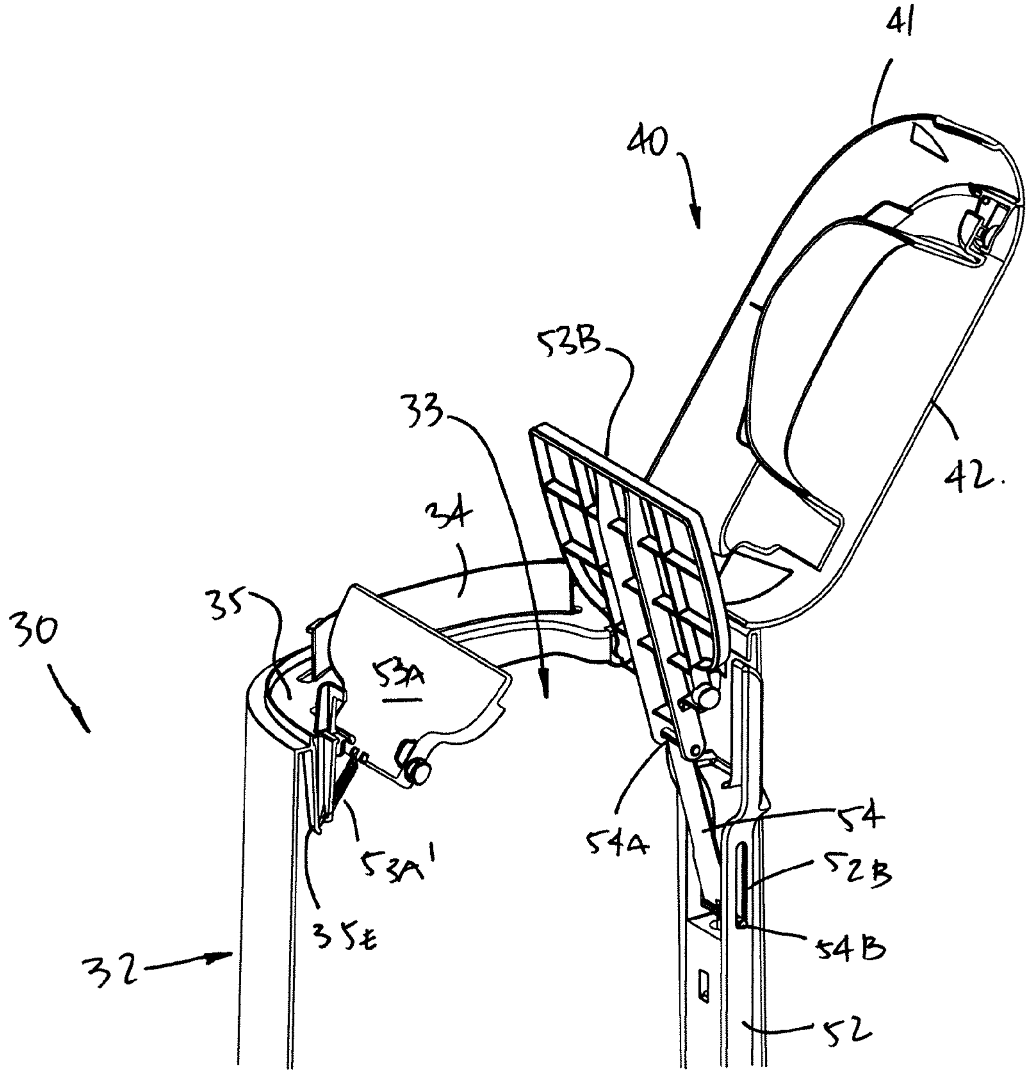
FIG. 5 is a partly sectioned perspective view of the waste disposal device of FIG. 1, in a bag replacement arrangement.
Figure 13:
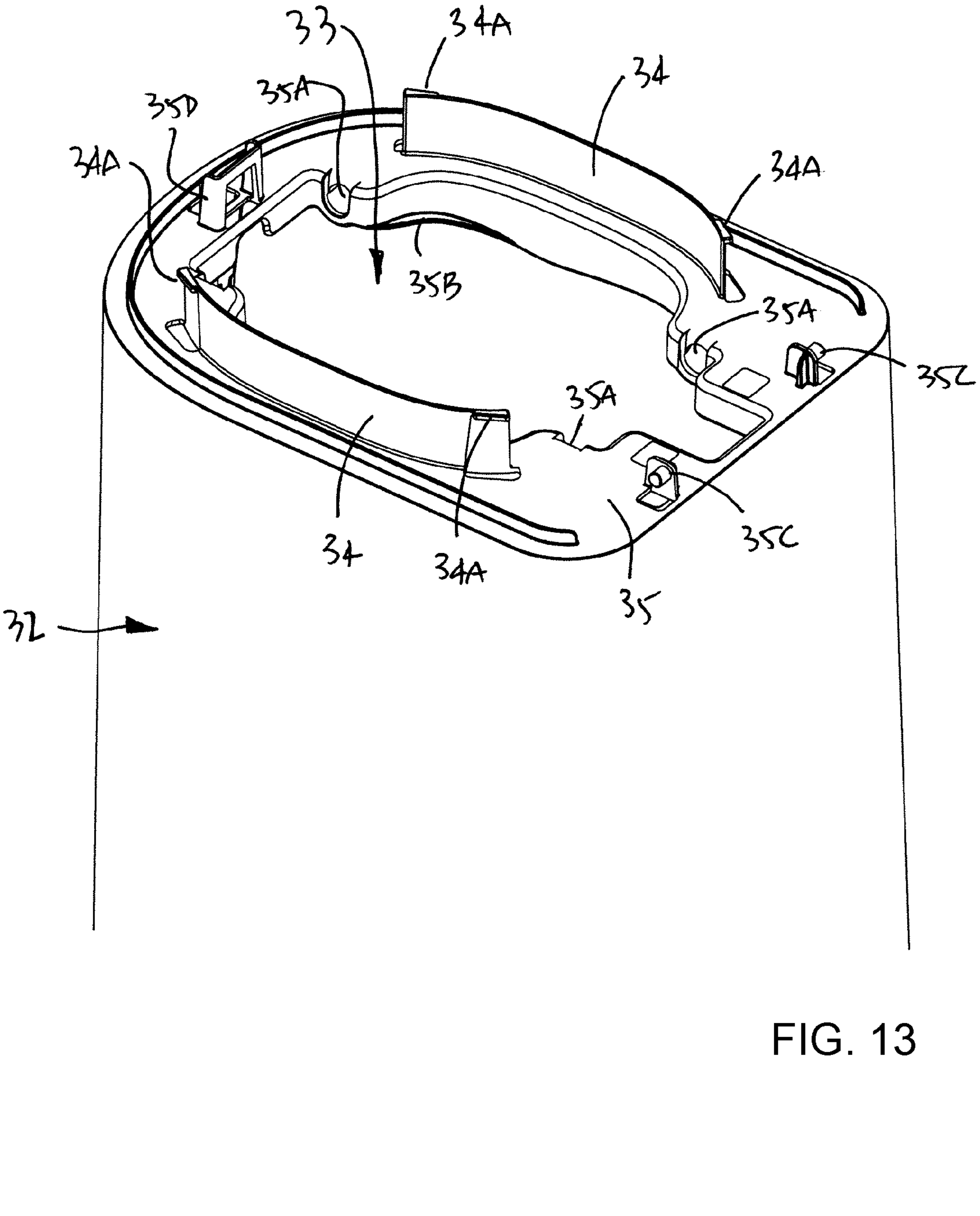
FIG. 13 is an enlarged perspective view of a top wall of the container of the waste disposal device of FIG. 1.
Figure 14:
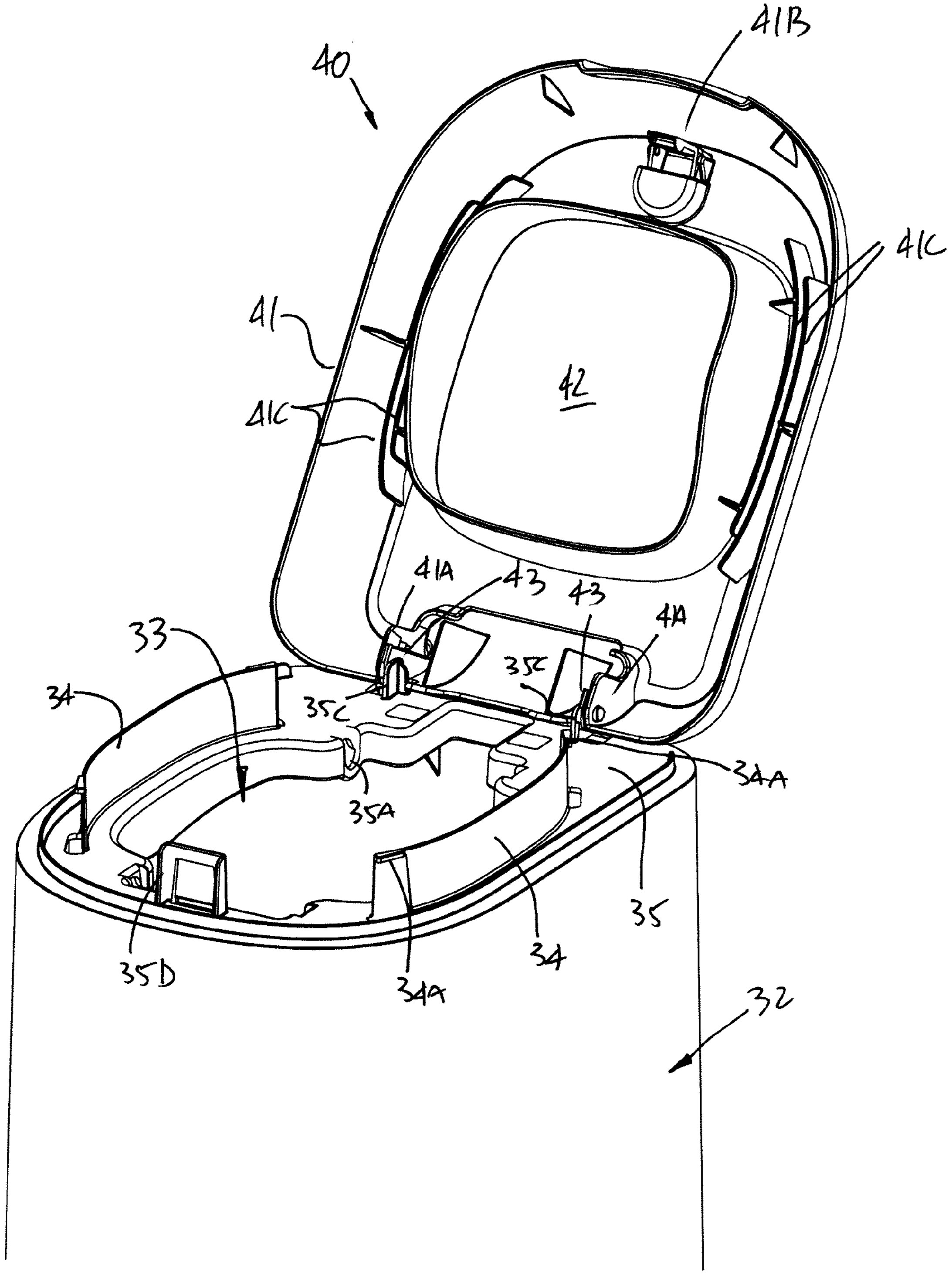
FIG. 14 is the top wall of the container with the lid assembly of the waste disposal device of FIG. 1.

Referring to FIGS. 5, 13 and 14, upper collar(s) 34 bound at least part of the opening 33, and may be the interface between the lid assembly 40 and the container 30. The collars 34 are shown, but other configurations are contemplated, such as a single U collar, or an annular collar. Bag hooks 34A may be located on outwardly facing surfaces (i.e., on a side opposite the opening 33) of the upper collars 34, in the vicinity of the opening 33, and serve as an attachment for the bag dispensed by the cassette 20. In the embodiment, four of the bag hooks 34A are in the container 30 (two visible), but there may be more or fewer, for one or more collars 34. The four bag hooks 34A may be at the corners of the opening 33, which opening has a squircle or elliptical shape. If the opening 33 is round, the bag hooks 34A may be distributed at 0/90/180/270 degrees, or 0/120/240 degrees, among numerous other examples. As an example, there may be two diametrically opposed elongated bag hooks 34A. As an alternative to bag hooks, the container 30 may rely on its collar(s) 34 for attachment of the bag, with a top of the bag being folded over the collar(s) 34 and being retained by friction. The hooks 34A may take the form of a lip or flange. The interfaces for bag are shown as collars 34 and/or hooks 34A, but other interfaces for bag include pins, grips, pliers, bores, pin and bore steps, a single collar, etc.

Referring to FIGS. 5, 13 and 14, the upper collars 34 may be at a top of a wall 35 having a pair of U-shaped formations facing each other and defining the opening 33 between them. The wall 35 may be a monolithic molded component, for instance as part of the top portion 32, with many features to act as a functional support for numerous components described below. Hinged door supports 35A may be defined in the wall 35 adjacent to the opening 33, for hingedly supporting door doors as explained after that close or open access to an interior of the container 30 from the opening 33, while shutting the bag closed to seal odors into the bag. Hinged door supports 35A are shown as being pivot receptacles, but may include a pivot(s) and/or pivot hole(s). The wall 35 may also define a shoulder(s) 35B in the periphery of the opening 33, to act as an abutment or stop, and block one of the doors from pivoting downwardly.

Hinged lid supports 35C may be defined in the top portion 32 adjacent to an exterior surface of the container 30, for rotatably supporting the lid assembly 40, also to close or open access to an interior of the container 30 from the opening 33. The hinged lid supports 35C may be in the form of posts or columns with pivot members, as an embodiment. A pivoting of the lid assembly 40 may also expose various components of the device 10. The hinged lid supports 35C may include pivot(s) as shown and/or pivot hole(s).

A retaining member 35D may be provided on a side of the top portion 32 opposite the hinged lid support 35C for releasably retaining the lid assembly 40 in the shut portion of FIG. 1. A detent mechanism may collaborate with the retaining finger 35D to keep the lid assembly 40 shut, as described hereinafter. In an alternative embodiment, the retaining member 35D may be of the cantilever type, retaining the hinged lid support 35C by way of elastic deformation biasing. An arm 35E (FIG. 5) may be provided to project from a top portion 32 of the container 30, such as the wall 35, into the inner cavity of the container 30, and may assist in maintaining the doors shut as described below.

Figure 6:
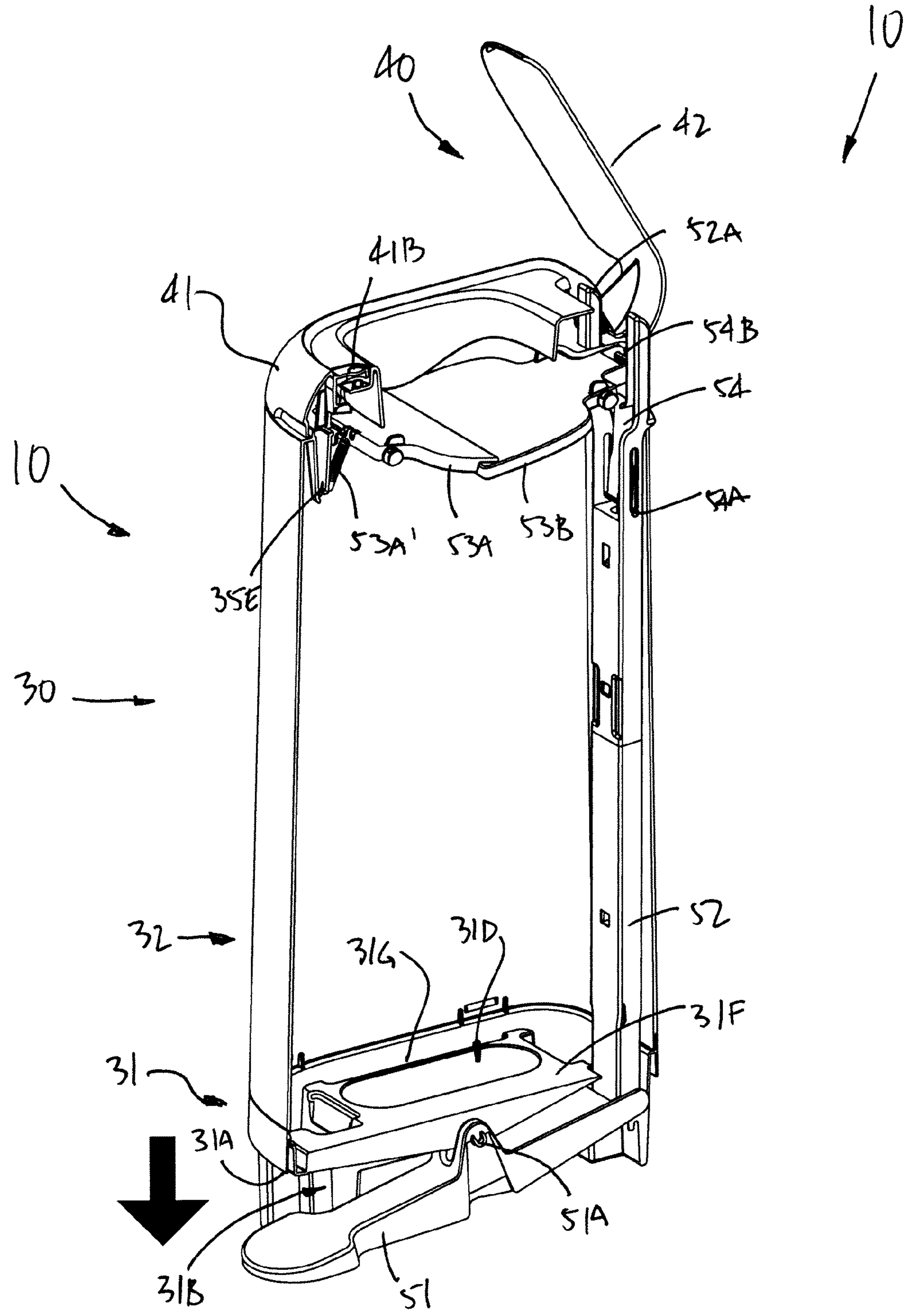
FIG. 6 is a partly sectioned perspective view of the waste disposal device of FIG. 1, in a waste disposal arrangement.
Figure 7:
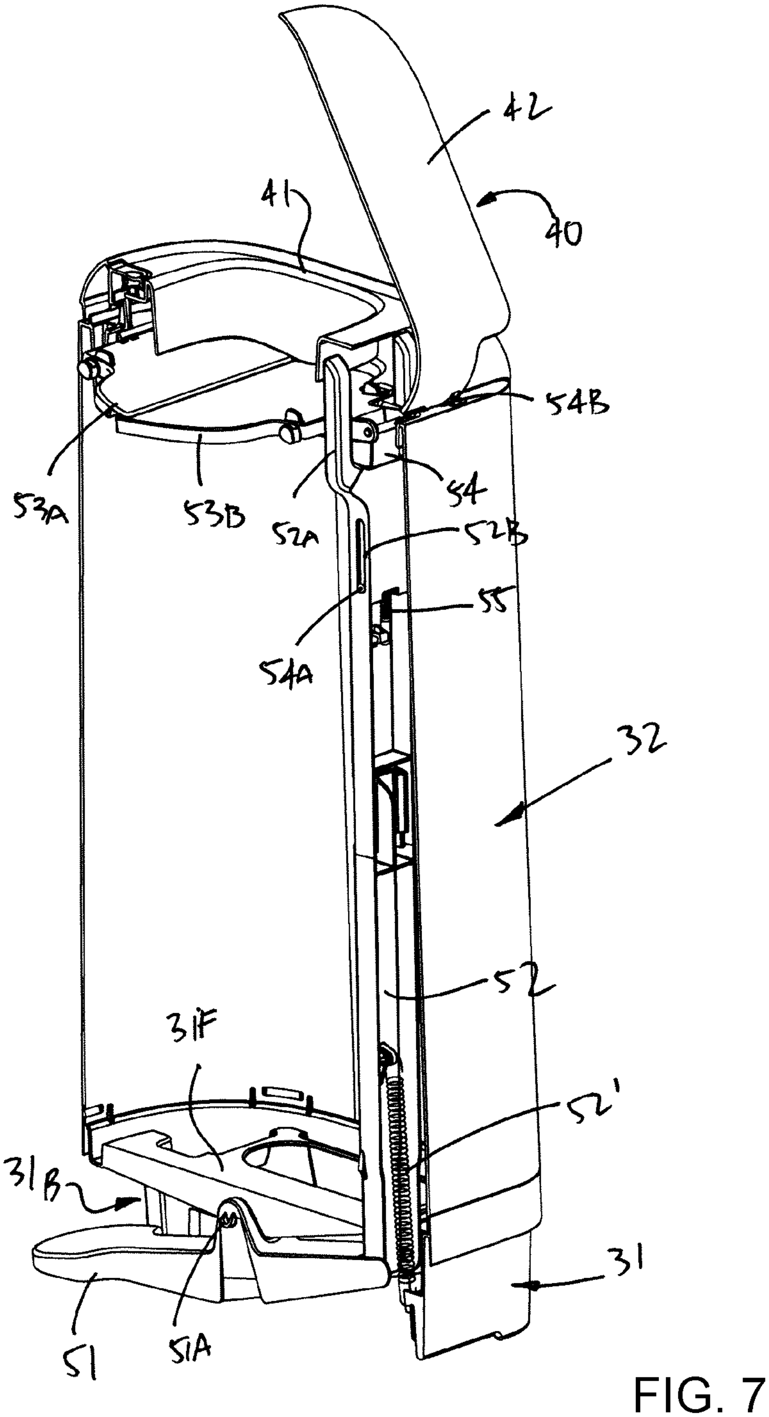
FIG. 7 is a partly sectioned perspective view of the waste disposal device of FIG. 6, from another perspective.
Figure 8A:
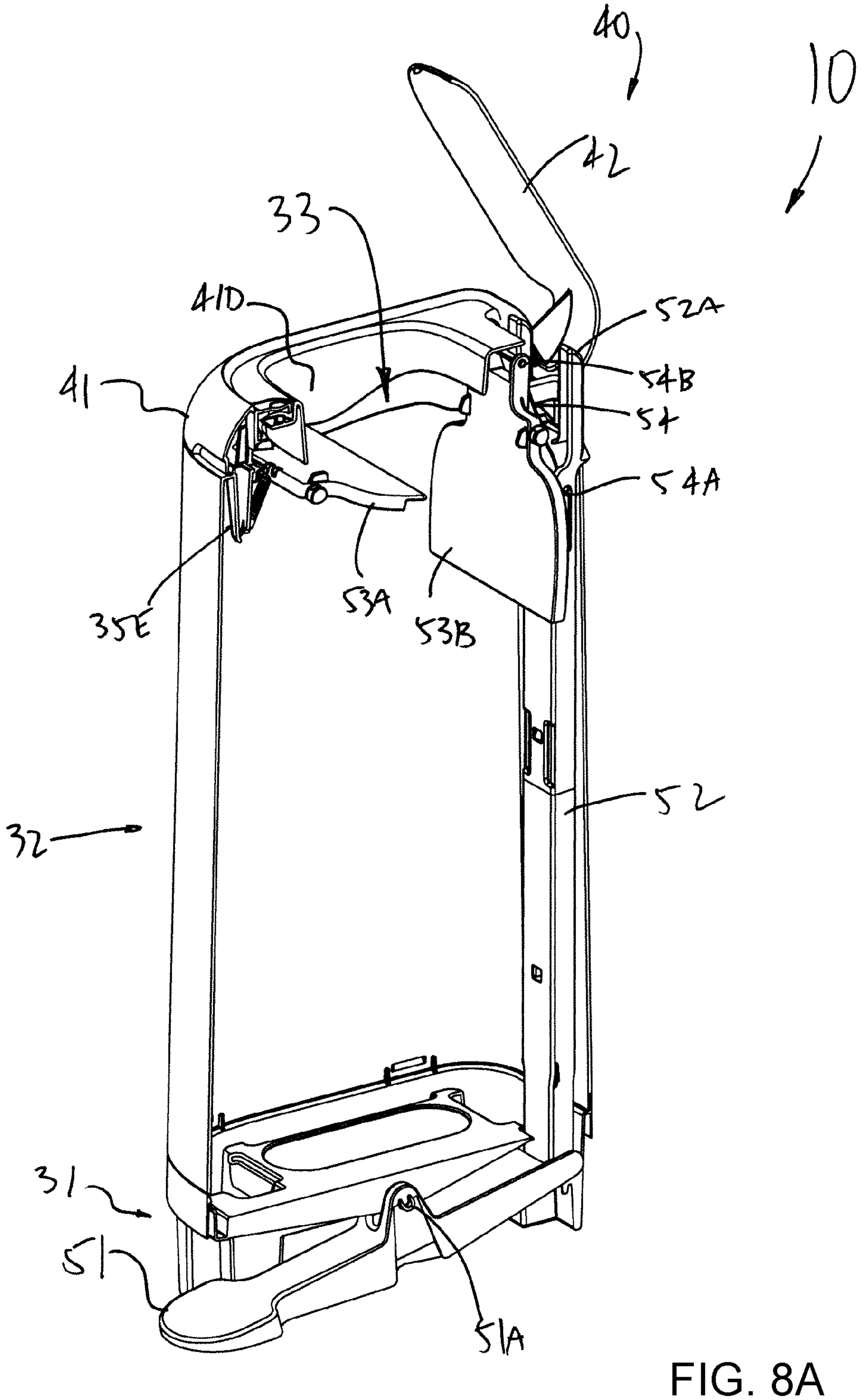
FIG. 8A is a partly sectioned perspective view of the waste disposal device of FIG. 6, further along a waste disposal step.
Figure 8B:
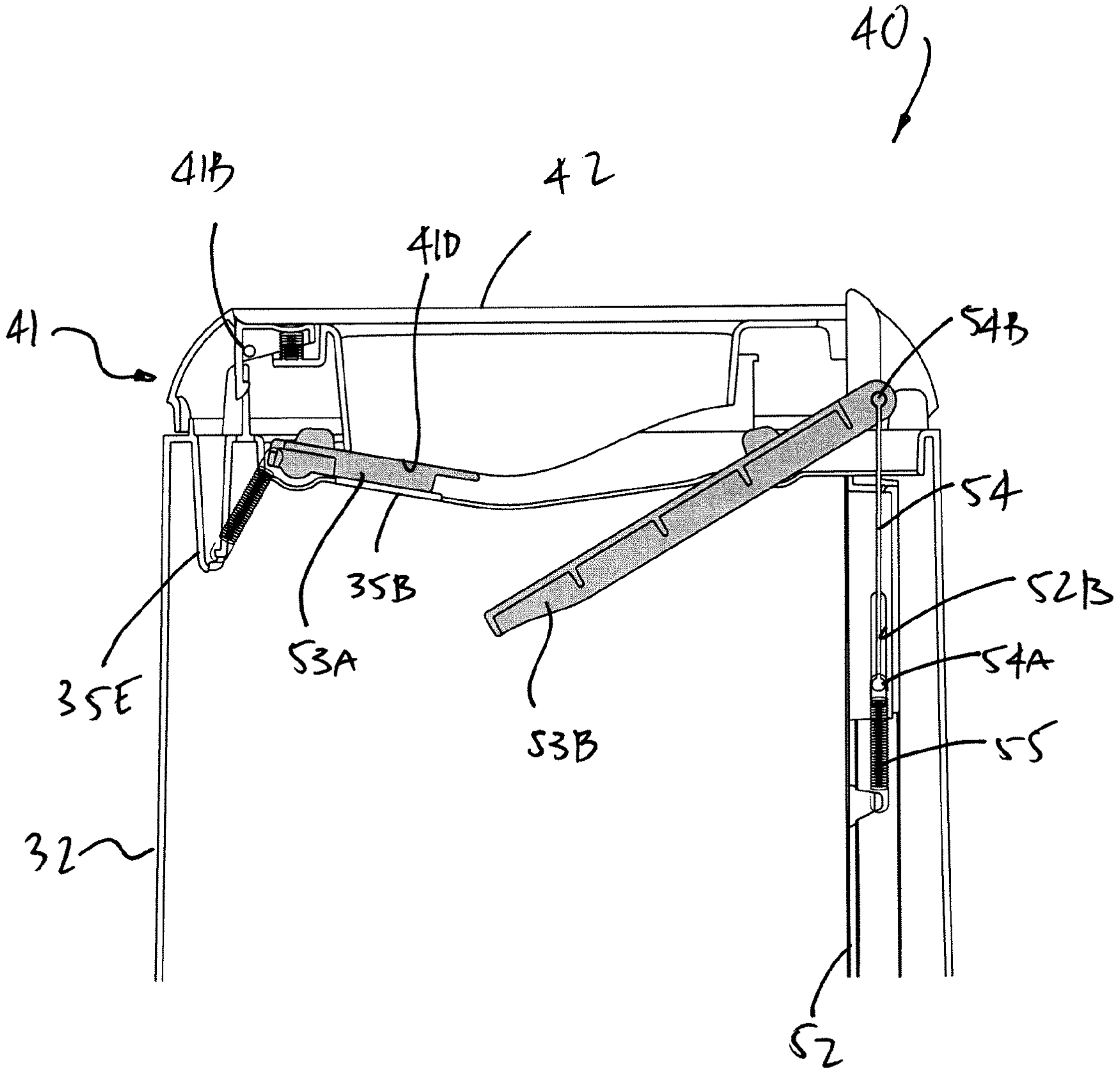
FIG. 8B is an enlarged sectional view of the waste disposal device as in FIG. 8A.
Figure 9:
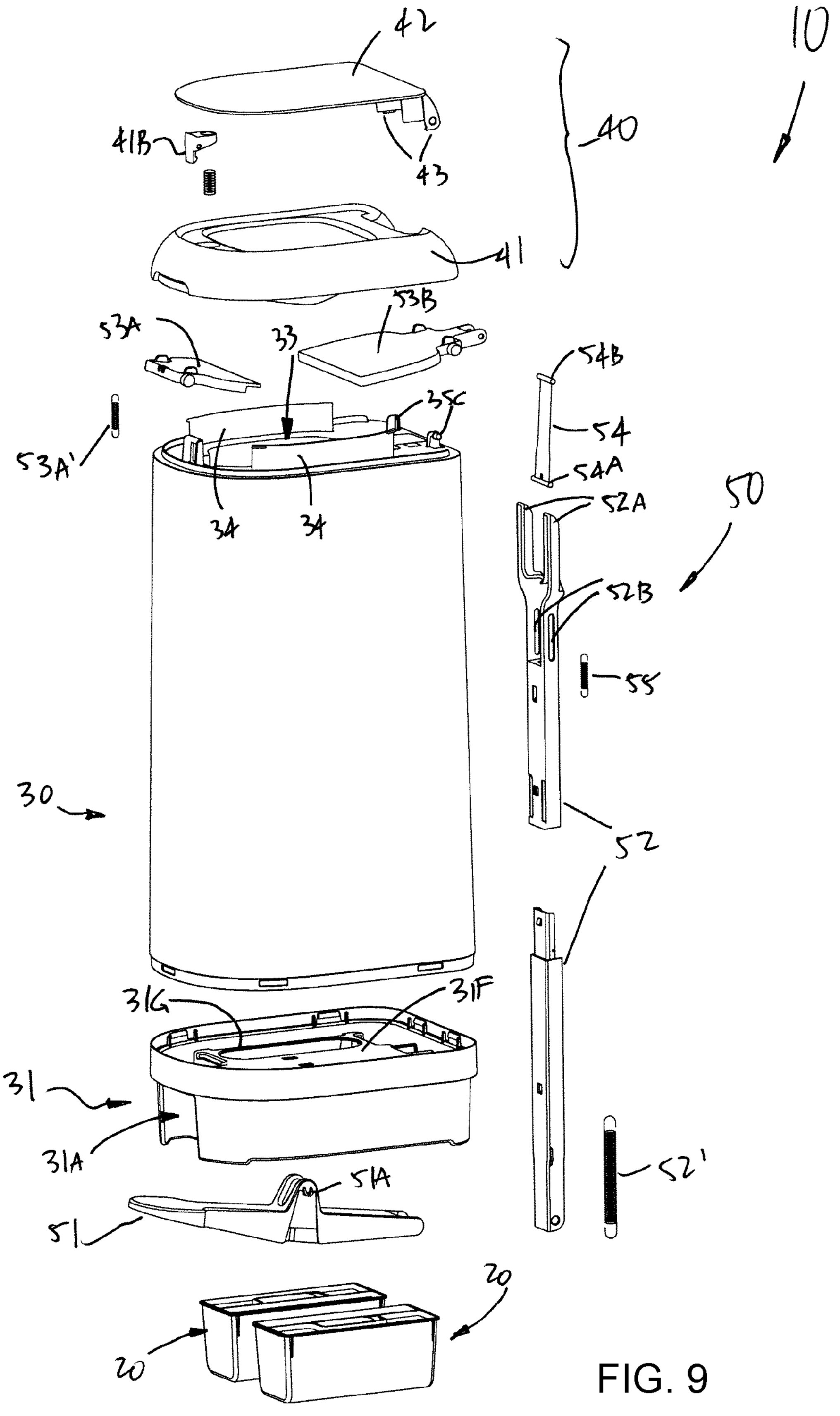
FIG. 9 is an exploded view of an actuation mechanism of the waste disposal device of FIG. 1.

Referring to FIGS. 1 and 6-9, the lid assembly 40 has an annular base 41. The geometry of the annular base 41 is complementary to that of the upper end of the top portion 32 of the container 30, including the collars 34. Accordingly, the annular base 41 of the lid assembly 40 is seated on the upper end of the container 30, such as on the wall 35. The annular base 41 may also have a skirt-like body as in FIG. 1, to conceal and cover the collars 34, in its downwardly opened annular cavity. In the illustrated embodiment, the annular base 41 is connected to hinged lid supports 35C so as to pivot, for example from the shut orientation of FIG. 1 to the open orientation of FIG. 6. The annular base 41 has the complementary hinge joint component(s) 41A, such as pivot holes, pivot, etc. As shown in FIG. 9, a detent 41B with spring may be present to releasably connect to the retaining member 35D. Other interconnection arrangements are considered such as a press-fit, quick connect system, threading engagement, or the like. The annular base 41 may for instance be pivoted to the open orientation of FIG. 6 to attach or detach a bag to or from the collars 34. Moreover, projections 41C (FIG. 5) may be positioned opposite and in close proximity to the hooks 34A for film to be retained therebetween. The projections 41C may be pairs of walls. As seen in FIGS. 7, 8A and 8B, the annular base 41 may have a funnel portion 41D. The funnel portion 41D ensures that waste is directed toward the opening 33. Moreover, the funnel portion 41D may have a wavy pattern to assist in closing some of the components as described below.

A lid 42 is pivotally connected to the top portion 32 of the container 30 or to the annular base 41 by hinge members 43. In an embodiment, the hinge members 43 are also operatively connected to the hinged lid supports 35C. Therefore, the lid 42 may pivot between an opened position, as shown in FIGS. 5-8, and a closed position, as shown in FIG. 1. In the closed position, the lid 42 blocks the opening 33. In the opened position, the opening 33 is exposed, whereby a user may throw waste into the bag in the device 10. The lid 42 may pivot independently from a remainder of the annular base 41. In an embodiment, as both the annular base 41 and the lid 42 are pivotally connected to the hinged lid supports 35C, the rotation axis of the lid 42 and the axis of rotation of the annular base 41 are coaxial.

Referring to FIGS. 1 and 5-9, the actuation mechanism 50 consists of linkages (i.e., links and joints) interfaced by a user with a pedal 51. The pedal 51 is pivotally connected to the base portion 31 of the container 30, via its pivot formations 51A as one possible configuration (separate pivot being another). A front portion of the pedal 51 projects outwardly from a front side of the container 30, and is close to the ground, whereby a user may simply press on the exposed portion of the pedal 51, to open the lid 42 of the device 10. The device 10 may be provided with alternative interfaces, like a hand lever or the like. The actuation mechanism 50 therefore has a link assembly having one or more links and joints therebetween the cause an opening of the lid 42, and act on doors described hereinafter.

According to an embodiment, a first link 52 is connected to a rear portion of the pedal 51, inside the container 30. The connection may be a pivot connection as shown, but a translational joint could also be used. The first link 52 may be connected to structural components in the container 30 such as openings in the base portion 31 and the top portion 32, so as to be restricted to translational movement (i.e., up and down). Accordingly, by pressing downwardly on the front portion of the pedal 51 as shown in FIG. 6, the first link 52 moves upwardly. The subsequent release of the pedal 51 may cause the first link 52 to move downwardly, for instance by way of gravity. A spring 52' (FIG. 7) may optionally be provided to pull the first link 52 downwardly. The first link 52 may be made of a single segment, or multiple segments (two shown) that may be assembled, such as by mating connection.

Still referring to FIGS. 1 and 6-9, the first link 52 has lid-pushing ends 52A. The lid-pushing ends 52A contact the lid 42 adjacent to its rotational axis. The ends 52A may be part of a two-pronged fork with cam surfaces defining the ends 52A, though a single end 52A could also be present. The ends 52A may project out of openings defined in the wall 35, which opening may ensure that the ends 52A move in a translational manner. The two-pronged fork is one possible arrangement. Other embodiments are contemplated.

The two-pronged fork hence defines a cavity. Guide slots 52B may be formed into the cavity of the two-pronged fork. Accordingly, an upward movement of the first link 52 results in the opening of the lid 42 by the pushing action of the end 52A on the lid 42. Similarly, a downward movement of the first link 52 causes the movement of the lid 42 toward the closed position, by the retracting movement of the end 52A.

In addition to transmitting motion of the pedal 51 to the lid 42, the actuation mechanism 50 may also have an operative effect on doors 53A and 53B that seal the bag closed. The doors 53A and 53B may also be known as flaps, traps, jaws, etc. The doors 53A and 53B are pivotally mounted to the hinged door supports 35A, by complementary pivot joints components (e.g., pivot(s) and/or pivot hole(s)). A biasing member 53A', such as a spring, may be present to bias the door 53A. In an embodiment, the biasing member 53A' may bias the door 53A to the pivoted position of FIG. 5. In an embodiment, the biasing member 53A' could alternatively bias the door 53A to the closed position of FIG. 1. The rotational axes of the doors 53A and 53B may be generally horizontal (e.g., ±10 degrees, though it could be more) when the device 10 is on the floor. The rotational axes of the doors 53A and 53B may be parallel to one another. Moreover, the door 53A may abut against the shoulders 35B whereby it may not pivot downwardly beyond the shoulders 35B, as an optional feature. The doors 53A and 53B are sized to come into contact with one another, thereby shutting a bag passing through the opening (e.g., attached to the collars 34). FIG. 1 shows a groove in the door 53A to receive an edge portion of the door 53B, in one possible arrangement.

A second link 54 interfaces the first link 52 to the door 53B. The second link 54 has a pivot 54A at one of its ends, and a follower 54B at the other of its ends. The pivot 54A is pivotally connected to the door 53B, thereby forming a pivot connection. The pivot connection may be adjacent to the pivot connection between the door 53B and the wall 35. The second link 54 may be lodged in the two-pronged fork of the first link 52, with the follower 54B received in the guide slots 52B. The follower 54B may therefore rotate and/or translate in the guide slots 52B. A single set of guide slot 52B and follower 54B could also be used instead of the shown pair.

The operative interaction between the first link 52, the door 53B, and the second link 54 is now described. As a starting point, the doors 53A and 53B are against one another, shutting a bag between them, and pivotally mounted to the wall 35 via their integrated pivot portions (being one possible configuration). Referring to FIGS. 6 and 7, a user may press on the pedal 51, in order to dump litter in the bag. As a consequence, the first link 52 moves upwardly. The lid-pushing end(s) 52A applies a pressure on the lid 42, that pivots upwardly to the position shown in FIGS. 6 and 7. At that moment, the follower 54B is at a bottom of the guide slots 52B of the link 52. Spring 55 or like biasing member (e.g., gravity) may ensure that the door 53B remains closed as in FIG. 6. If pressure is applied downward onto the door 53B, such as dropping waste on the top surface of the door 53B, the door 53B can pivot downwardly to allow the waste into the bottom of the bag in the container 30, for instance against action of the spring 55 if present. In an embodiment, the door 53A does not move when the door 53B pivots downwardly. The follower 54B would as a result move upwardly in the guide slots 52B. FIG. 8A shows a contact of the follower 54B with the top of the guide slots 52B, the slots 52B acting in such instance as abutment stops. If pressure is released on the pedal 51, spring 55 between the second link 54 and the first link 52 would bias the door 53B back to its position of FIG. 1, shutting the back between the doors 53A and 53B such that odors may be blocked from exiting the bag. The release of pressure on the pedal 51 would also result in the downward motion of the first link 52 and thus the closing of the lid 42. Throughout the steps of disposing of waste using the actuation mechanism 50, the door 53A remains in its position.

When the pedal 51 is pressed downwardly, the lid 42 is raised, thereby exposing the opening 33 and the doors 53A and 53B, which doors 53A and 53B are in a closed position (though the expression closed orientation could be used as well). The spring 52' may cause a bias of the actuation mechanism 50 on the doors 53A and 53B, for the doors 53A and 53B to be against one another. The follower 54A may be pressed by the ends of the slots 52A. A user may consequently throw away an object. The object's weight may be greater than the biasing action of the spring(s) 55 or like biasing mechanism, whereby the door 53B temporarily opens to let the object(s) through. This may be referred to as one pivoted position (though the expression pivoted orientation could be used also). Once the object is beyond the doors 53 and into the bag, the door 53B returns to the closed position against the door 53A (FIG. 1) and squeezes the bag between them. When the pedal 51 is released, the second link 54 moves downwardly as pulled by the spring 55, thereby exerting a pressure on the door 53B, to ensure that it is forced against the door 53A in the manner shown in FIG. 1.

When the bag is filled and needs replacement, the whole lid assembly 40 is pivoted away as in FIG. 5, without pressing on the pedal 51. This exposes the top end of the bag attached to the hooks 34A. The top end of the bag is detached from the hooks 34A, and may be pulled upwardly. As the funnel portion 41D no longer presses against it, the door 53A may move to the pivoted position of FIG. 5. As for the door 53B, the follower 54B is at the top of the slots 52B and may go downward freely (while the door 53B pivots upward). Accordingly, an upward pull on the bag pivots the doors 53A and 53B upwardly as in FIG. 5, in another pivoted position (though the expression pivoted orientation could be used as well). In an embodiment, for the doors 53A and 53B to be pivoted away from the cavity as in FIG. 5, the pedal 51 must be released, as the collaboration between the links 52 and 54 may act as a stopper. The bag may therefore be removed from the container 30 by the upward pull. As the bag is part of the roll 25 or like sequence of attached bags, the next bag is concurrently pulled up to the level of the collars 34. Once the full bag is detached from the roll 25, the next empty bag in the roll 25 may be attached to the collar 34.

When closing the doors 53A and 53B once another bag has been attached to the bag interface (e.g., collars 34), a sequence of action will occur for the door 53B to be below the door 53A, if the door 53A does not pivot inward of the inner cavity of the container 30 by way of its abutment with the shoulder 35B. The door 53B may be urged downwardly by the action of the spring 55 and gravity, and optionally by contact of the annular base 41. While this occurs, the door 53A is kept up by the spring 53A'. Then, the funnel portion 41D comes into contact with the door 53A, and pivots it to the closed position. In an embodiment, in the closed position, the door 53A is sandwiched between the shoulder 35B and the edge of the funnel portion 41D, so as to remain in the closed position, as shown in FIG. 8B.

Therefore, the actuation mechanism 50 may have two or more interconnected links. In an embodiment, the pedal 51 and first link 52 are connected by a joint providing at least one degree of freedom (DOF). In an embodiment, the joint provides a rotational DOF. The first link 52 may not be physically tied to the lid 42, but may instead have the lid 42 float on its end(s) 52A. The first link 52 and the second link 54 may be connected by a joint with two DOFs, or more. In an embodiment, the two DOFs are a rotational DOF and a translational DOF. The translational DOF may be biased by spring 55. The second link 54 and the door 53B may be connected by a joint with a rotational DOF, if not more. The rotational DOF joint may be located outward of a pivot connection between the door 53B and the wall 35. The doors 53A and 53B may each be connected to the wall 35 by a rotational DOF joint.

Figure 10:
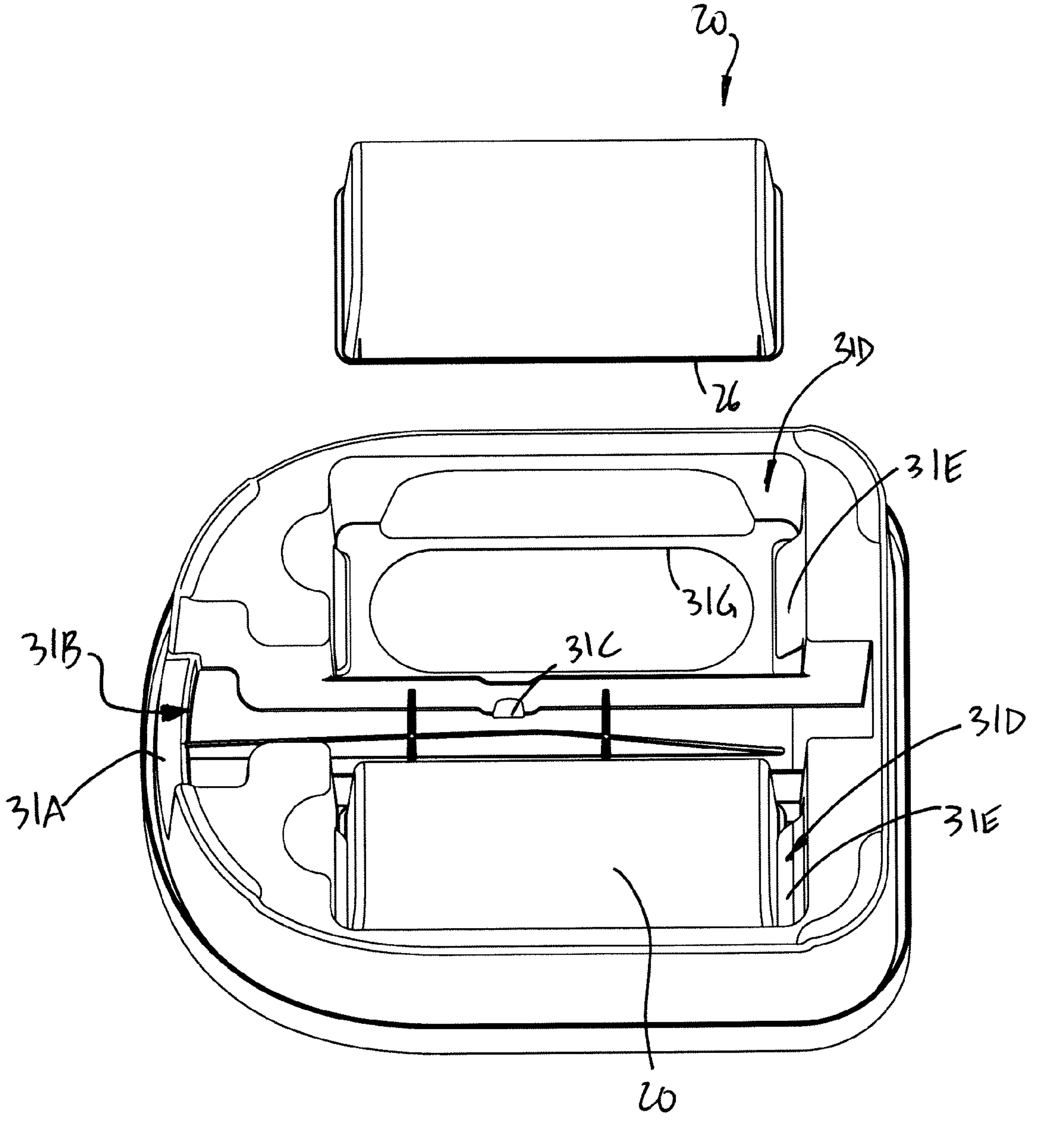
FIG. 10 is an underside perspective view of the film dispensing cassette being inserted into the waste disposal device of FIG. 1.
Figure 11:
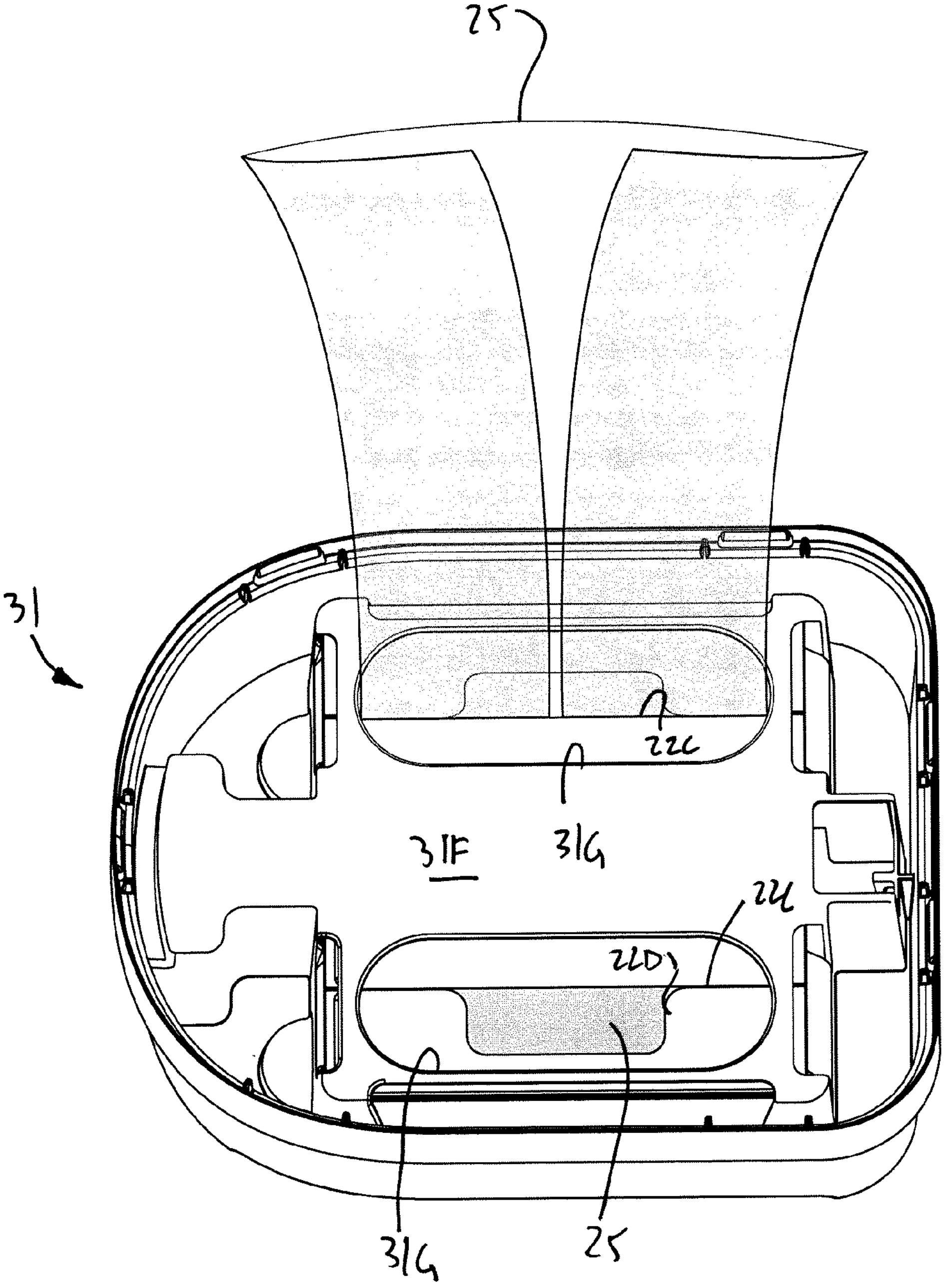
FIG. 11 is a perspective view of a pair of the film dispensing cassettes installed into the waste disposal device of FIG. 1.

Referring now to FIGS. 10-12, it is shown that a pair of cassettes 20 may be received in the base portion 31. The device 10 may work with a single cassette 20, but the presence of two cassettes 20 doubles the capacity of the assembly. In an embodiment, a first cassette 20 is emptied before a second cassette 20 is used. The base portion 31 may have inward projections to ensure that the cassettes 20 are oriented in the manner shown, i.e., with the inward abutment formations toward the center.

Other embodiments include: a different shape for the doors 53; both of the doors 53 being movable downwardly; a single door 53 being present; the use of EVOH for the tubular film 25; the use of the device 10 without the cassette 20, with unitary bags instead; the use of the device 10 with a bag roll that is not part of the cassette 20; the use of the cassette in another type of device 10, such as a pail without doors and without the actuation mechanism 50.

The actuation mechanism 50 may therefore have an equilibrium state as shown in FIG. 1, with an open bag 25 attached to the collar(s) 34 and extending into the container 30. In the equilibrium state, the doors 53A and 53B are against one another, in the closed position, with the bag closed between the doors 53A and 53B. The various springs of the actuation mechanism 50, including springs 52' and 55, may assist in ensuring that the door 53B remains in the closed position against the door 53A. The spring 53A' may also contribute to this equilibrium state. Moreover, gravity on the link 52 may exert a pulling force on the door 53B. By having the top of the slots 52B pressing against the follower 54A, the doors 53A and 53B squeeze the bag between them. In an embodiment, the cassettes 20 provide sufficient film for a prolonged period whereby fewer replacement cassettes may be required.

When the pedal 51 of the actuation mechanism 50 is pressed, the lid 42 opens up and the linkage assembly, e.g., including the first link 52 and second link 54, no longer retain the door 53B from pivoting downwardly other than by the action of spring 55. However, the weight of waste on the door 53B and/or of hand pressure may readily pivot the door 53B to a pivoted position inward of the container 30. Moreover, by having both doors 53A and 53B pivotable to an open pivoted position as shown in FIG. 5, the bag with volume therein may be pulled out of the container by this non-negligible area or cross-section of opening 33. This allows a user to empty the device 10 from the top.

Referring to the drawings and more particularly to FIGS. 15-28, a waste disposal device (hereinafter "device") in accordance with another embodiment of the present disclosure is generally shown at 110. The device 110 is of the type using a film dispensing cassette 120 (hereinafter "cassette" 120) dispensing film that may form a tubular bag. Any other suitable type of bag dispenser may be used as well with the device 110. The device 110 has a container 130, a lid assembly 140 and an actuation mechanism 150.

The container 130 forms the structure of the device 110, and accommodates and conceals the tubular bag containing waste. The container 130 is not limited to the shape illustrated in the Figs. Any suitable geometry is considered as well.

The lid assembly 140 opens and closes a top opening of the container 130, through which the waste is thrown into the bag supported by the device 110.

The actuation mechanism 150 is manually actuated to open and close the lid assembly 140, and to interact with a pair of jaws that close off the bag to seal odors therein. The jaws may be arranged to have the ensure that the bag is closed when the lid of the lid assembly 130 is closed.

Figure 16:
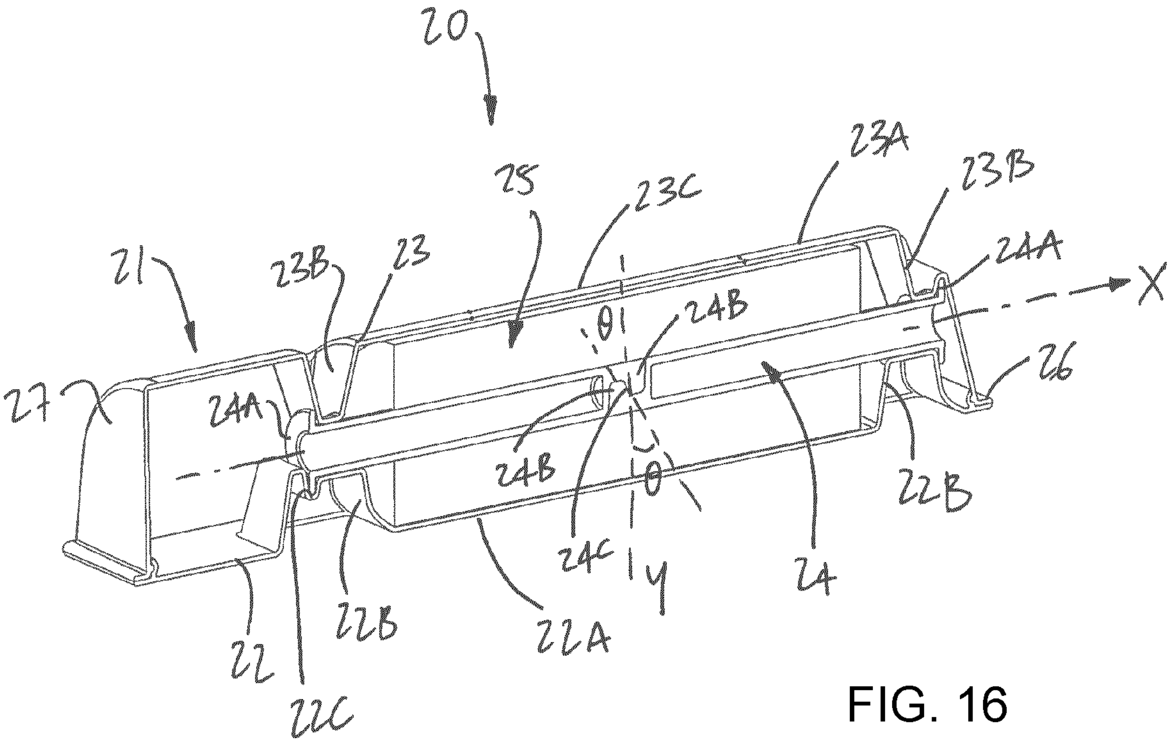
FIG. 16 is a longitudinally sectioned perspective view of the film dispensing cassette of FIG. 15.

Referring to FIGS. 16 to 19, the cassette 120 is shown in greater details, with parts thereof shown in the 120*s*. An interior of the cassette 120 is shown in FIG. 16. The cassette 120 has a casing 121 or body, having an elongated shape. The casing 121 may consist of one or more pieces interconnected to one another. In the illustrated embodiment, the casing 121 has a plate 122 and a cover 123. The plate 122 is generally the bottom part of the cassette 120 when used as described herein. The plate 122 has generally flat portion 122A, such that its undersurface forms a planar sliding surface. A pair of supports 122B project upwardly from the flat portion 122A. The supports 122B may define plain journal bearings as described hereinafter. One or both of the supports 122B may have a groove 122C. In an embodiment, the plate 122 may be an integrally formed monolithic piece including the flat portion 122A, the supports 122B and the groove 122C. As the plate 122 is relative thin and may be made of a polymer, cardboard or the like, it may exhibit a deforming capacity, a.k.a., it may bend away from its planar state of FIG. 16. The bending may elastic deformation for a good range of movement.

Figure 17:
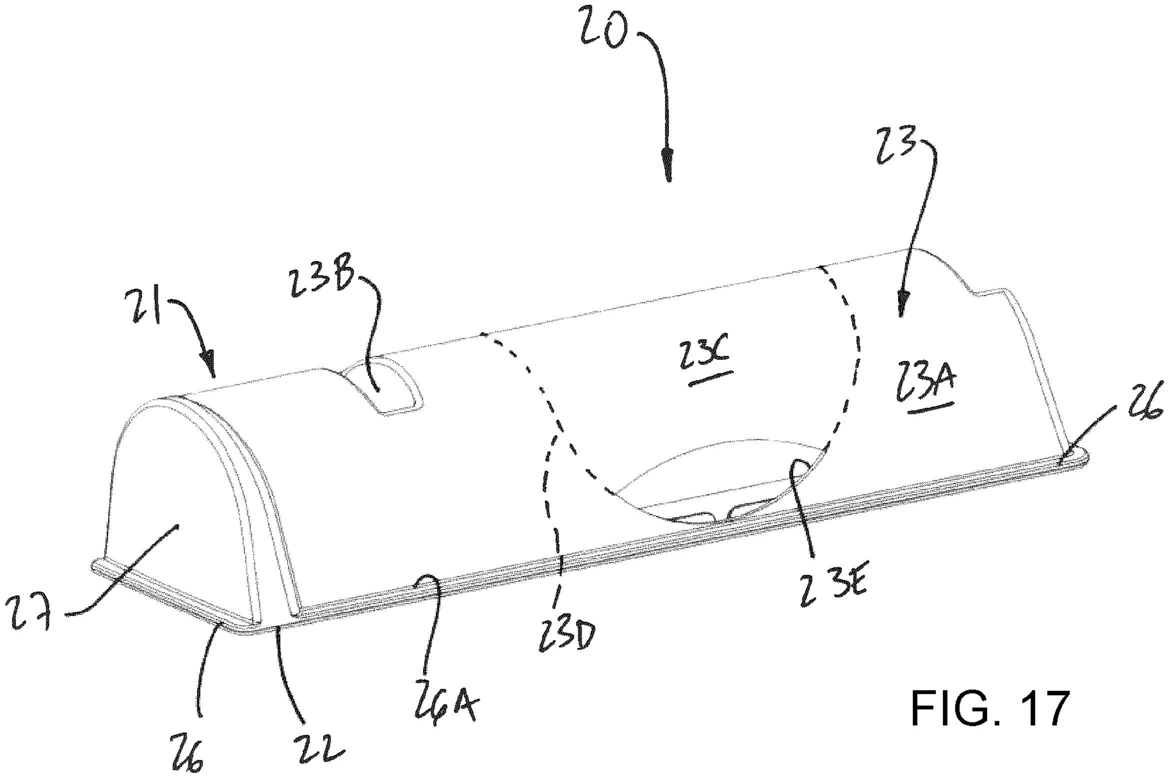
FIG. 17 is a perspective view of the film dispensing cassette of FIG. 16, with a door.
Figure 18:
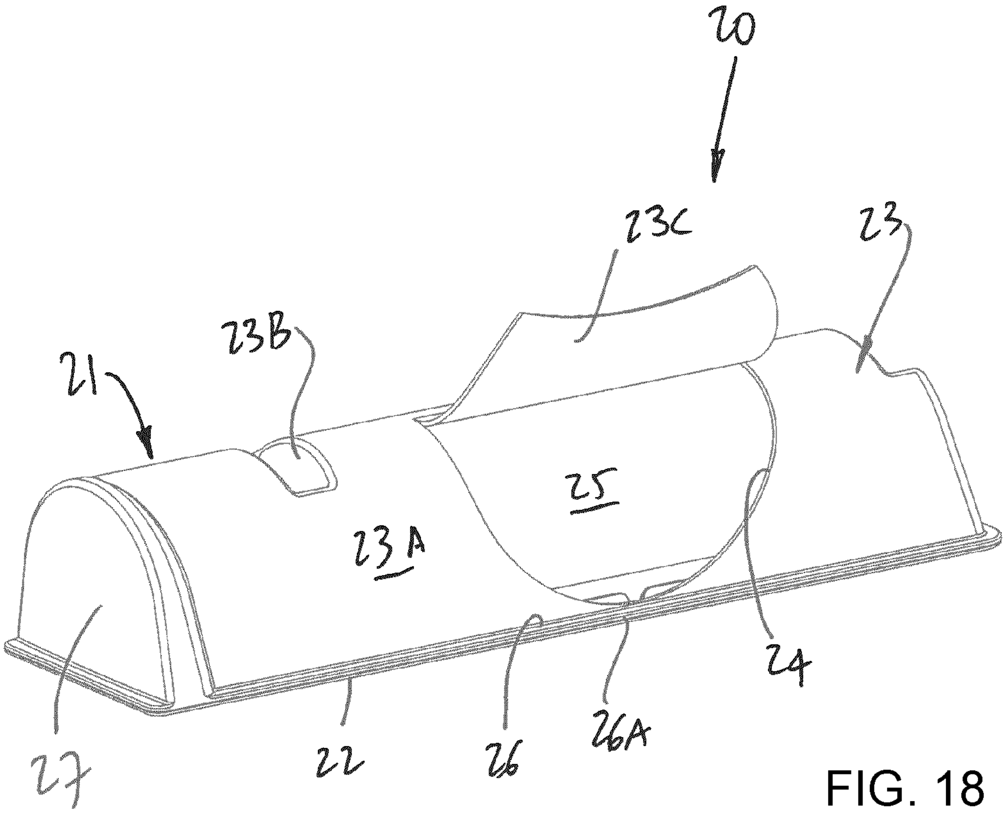
FIG. 18 is a perspective view of the film dispensing cassette of FIG. 16, with the door being removed.
Figure 19:
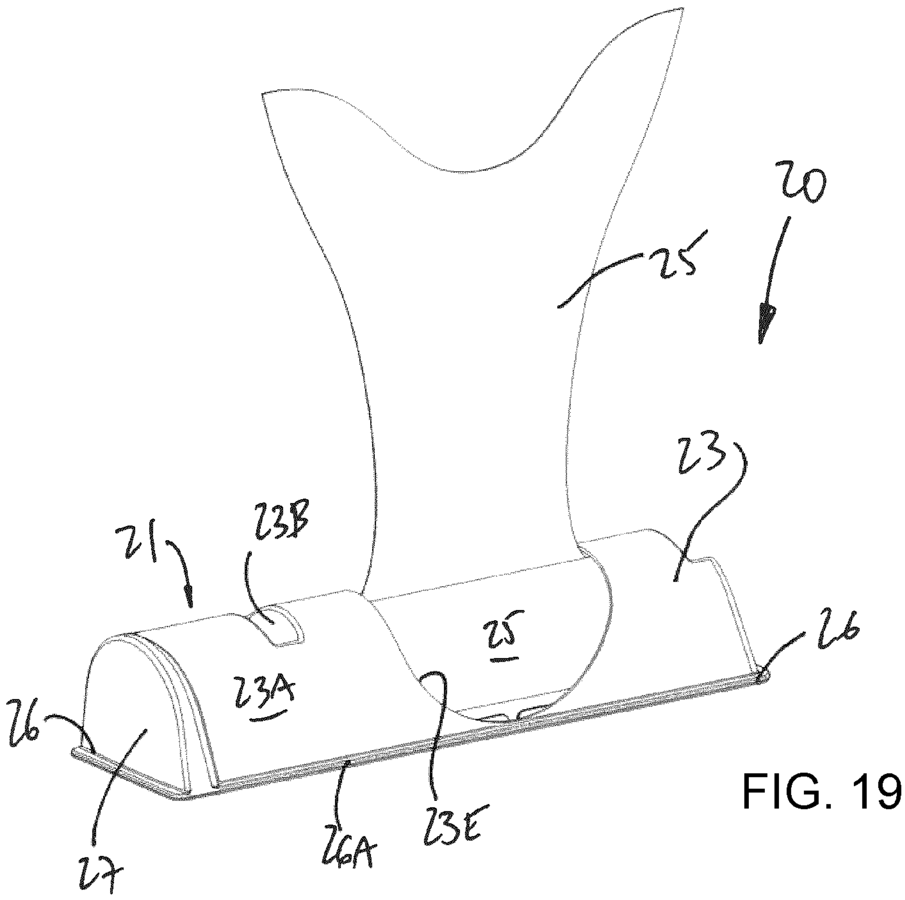
FIG. 19 is a perspective view of the film dispensing cassette of FIG. 16, with film projecting out.

Still referring to FIG. 16, the cover 123 forms a cavity by its hollow shape. The cover 123 has a wall 123A that forms most of the exposed peripheral surfacing of the cassette 120, with the flat portion 122A of the plate 122. Supports 123B project inwardly from the wall 123A and are located so as to be face to face and paired with the supports 122B of the plate 122. Each pair of one support 122B and one support 123B defines a plain journal bearing for rotatably supporting a shaft, such that the shaft may rotate on itself. A portion of the wall 123A, between the plain journal bearings, may be a door 123C that may be torn off from a remainder of the wall 123A. For this purpose, a tear line 123D may delimit the door 123C relative to a remainder of the wall 123A. The tear line 123D may be a thinner web in the wall 123A, or a series of perforations, facilitating detachment of the door 123C. According to an embodiment, as shown in FIG. 17, an opening 123E may be present for a user to grab the door 123C. In another embodiment, there is no door, with the wall 123A simply being opened at line 123D. Another component may alternatively be present to temporarily close off the opening (e.g., in the absence of a door), such as a label, plastic film, wrapping, etc. FIGS. 18 and 19 show the extent of the size of the opening 123E once the door 123C has been removed (if present). The opening 123E extends to or close to the plate 122. In an embodiment, there remains a small web of the wall 123A. In an embodiment, the cover 123 may be an integrally formed monolithic piece including the wall 123, the supports 123B, and the door 123C if present, although other arrangements are considered.

Referring to FIG. 16, a shaft 124 supporting a roll of bags or film 125 is shown as being rotatably supported by the plain journal bearings, such that the shaft 124 may roll on itself. The shaft 124 may have a pair of flanges 124A, at our near its ends. The shaft 124 may be formed of two shaft portions, interconnected by complementary interface members 124B. According to an embodiment, the two shaft portions, including the flanges 125A and the interface members 124B are identical, whereby the shaft 124 is made of two of the same piece. This piece may be molded, or may be fabricated in any other way.

The interface members 124B may hook-like shape with hook surfaces 124C contacting each other. According to an embodiment, the angle of the hook surfaces 124C is within a given range to enhance an interconnected between the interface members 124B. The range of angles can be described relative to a longitudinal axis X of the shaft 124, and to a plane to which the longitudinal axis X is normal. The plane is schematically shown as Y in FIG. 16. The angle, shown as θ in FIG. 16, is from 0 degree to 45 degrees, in an embodiment. The angle θ may also be greater than 45 degrees. As a result of the configuration of the interface members 124B, the two portions of the shaft 124 may not be pulled away from one another from a pulling force strictly along the longitudinal axis X, but radial forces on some parts of the shaft 124 may result in the separation of the shaft 124 in its two parts.

A length from flange 124A to flange 124A on the assembled shaft 124 is such that the flanges 124A are on distal faces of the plain journal bearings, with little or no play such that the shaft 124 may not or may minimally move along its longitudinal axis X. Moreover, one of the flanges 124A may be received in the groove 122C. Therefore, a four-point rectangular structure, or brace, is formed by the shaft 124, the plain journal bearings of support pairs 122B/122C and the flat portion 122A. When the two shaft portions of the shaft 124 are interconnected in the manner shown in FIG. 15, the resulting brace blocks deformation of the flat portion 122A.

A roll 125 of film is on the assembled shaft 124, whereby the shaft 124 may also be called a core. The expressions films, bags, tube, etc may be used to describe the roll 125. According to an embodiment, the roll 125 has bags made of tubular film connected end to end, with a free end of the roll 125 being defined by an open end of the bags. As seen hereinafter, the cassette 120 may be located in a bottom of the device 110, with the film of the roll 125 pulled upwardly and hung open to a top of the device 110, while remaining connected to a remainder of the roll 125. The other end of the roll 125 is wrapped onto the shaft 124. The other end of the roll 125 may be unconnected to the shaft 124. Retaining means may be present for the other end of the roll 125 to be attached to the shaft 124, such as an adhesive, tape, or a slit or grippers on the shaft 124. The wrapping of the roll 125 on the shaft 124 ensures that the two parts of the shaft 124 remain connected at the interface members 124B. The wrapping of the roll 125 is tight enough that little or no radial play is possible between the two parts of the shaft 124. The cassette 120 may be provided without the roll 125 of bags, with a user opening the casing 121 to insert a replacement roll 125 of bags.

Referring to FIGS. 14 to 19, the cassette 120 may have a rim 126. The rim 126 is formed at the bottom of the cassette 120. The rim 126 may consist of a portion of the plate 122 extending beyond the cover 123. Alternatively, the rim 126 may consist of a flange portion of the cover 123 extending beyond the plate 122. As shown in FIGS. 2 to 5, the rim 126 may be a combination of both a portion of the plate 212 and a flange at a bottom of the cover 123. The rim 126 may have numerous segments, continuous or discontinuous around the casing 121. The rim 126 may have two generally straight segments, parallel to one another, with one shown as 126A in FIGS. 17-19. The segments 126A may be described as translation joint members (a.k.a., sliding joint members, sliders, etc), as they may be used as part of a translation/sliding joint between the cassette 20 and the device 10. The rim 126 may also be known referred to as a shoulder(s), a flange, a lip, a strip, etc.

Referring to FIGS. 16 to 19, the cassette 120 may have a head 127, at an end of the casing 121. The head 127 may be defined by the plate 122 and/or by the cover 123, though it is shown as being mostly part of the cover 123 in the illustrated embodiment. The head 127 may be larger in cross-sectional dimensions than the cover 123. In the illustrated embodiment, the head 127 has an inverted U outline, though other shapes are considered.

Now that the cassette 210 has been described, a deployment of the film from the cassette 120 is set forth. If the cassette 120 comes with the door 123C or with wrapping or like membrane covering the opening 123E as in FIG. 17, the door 123C, wrapping or membrane is pulled away in the manner shown in FIG. 18, to expose an interior of the cassette 120, and more particularly the roll 125. The free end of the roll 125 may be connected (e.g., taped) to the door 123C, wrapping or membrane such that the free end of the roll 125 is pulled along. The free end of the roll 25 may then be out of the casing 121, via opening 123E, in the manner shown in FIG. 19, such that the film may be pulled out of the casing 121 while the roll 125 remains in the casing 121. When reaching the end of film on the roll 125, the shaft 124 is no longer retained in one piece by the film wrapping, whereby the shaft 124 may split into its two parts at the interface members 124B. If the end of the film on the roll 125 is attached to the shaft (e.g., with adhesive as described above), a pull on the film may assist in the separation of the shaft 124 into two parts, though gravity may suffice in having the shaft 124 split into its two parts. In another embodiment, the shaft 124 is made of a single part, but of collapsible material (e.g., cardboard shaft or core). In such a case, the upward pull on the film attached to the shaft 124 may result in the collapse of the shaft 124. In the separation of the shaft 24 in its two parts, or in the collapse of the shaft 124, the brace to which the shaft 124 contributed is broken, whereby the cassette 120 loses some structural integrity, and loses flexural stiffness.

Figure 15:
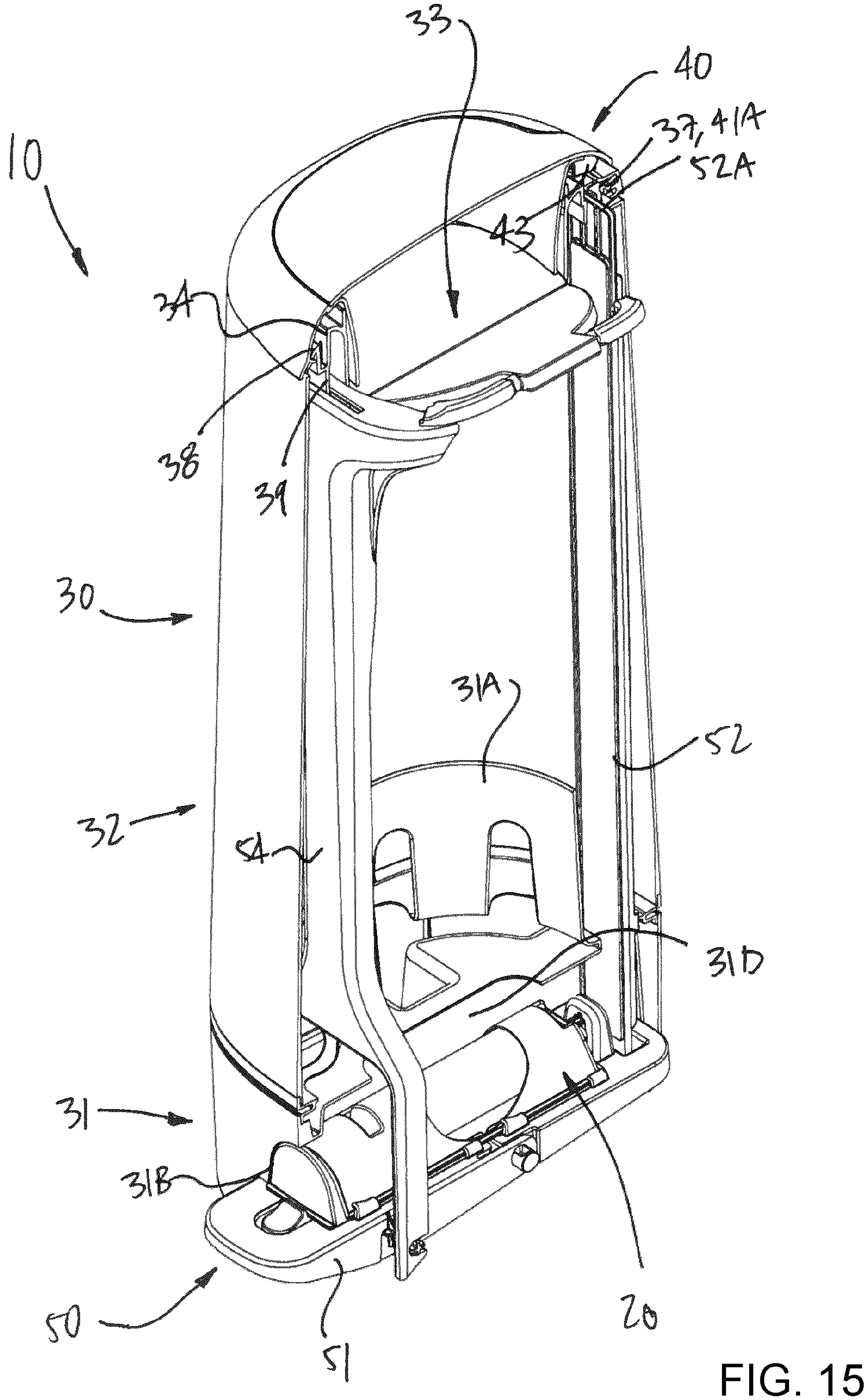
FIG. 15 is a partly sectioned perspective view of an assembly of a film dispensing cassette and waste disposal device in accordance with another embodiment of the present disclosure.

Referring to FIG. 15, the container 130 may have a base portion 131 and a top portion 132, that may or may not be separable to provide access to an interior of the container 130. The base portion 131 sits on the ground or floor when the device 10 is used. The base portion 131 may have an open-ended basket 131A that may serve as a guide for bags in the container 130. An opening 131B may be located in an outer surface of the base portion 131, for inserting the cassette 120 inside the container 130. An upper portion of the opening 131B may consequently have a shape complementary to that of the head 127 of the cassette 120, for complementary continuous finish of the assembly of the cassette 120 in the device 110, as in FIGS. 15, 20 and 21. A pedal of the actuation mechanism 150 may also project out of the opening 131B. For the pedal to be pivotally supported, the base portion 131 may have pivot supports 131C acting as plain bearings, as one possible embodiment. The pivot supports 131C may be part of a mount 131D having a top opening and receiving thereon the cassette 120 and pedal. The various components of the base portion 131A may be integrally molded into a single piece, or may be constituted of numerous pieces.

The container 130 may also be a single tubular unit, but other constructions are contemplated, for instance a tube or sleeve of fabric or paneling over structural beams. An opening 133 is at a top of the container 130. The opening 133 provides access to an interior of the container 130, for the disposal of waste in the bag.

An upper annular collar 134 bounds the opening 133, and is the interface between the lid assembly 140 and the container 130. The upper annular collar 134 may be at a top of a skirt 134A with a U-shape section, defining an annular cavity oriented downwardly. Bag hooks 135 may be located in the vicinity of the opening 133, and serve as an attachment for the bag dispensed by the cassette 120. Four of the bag hooks 135 are in the container 130 (two visible), but there may be more or fewer. The four bag hooks 135 may be at the corners of the opening 133, which opening has a squircle or elliptical shape. If the opening 133 is round, the bag hooks 135 may be distributed at 0/90/180/270 degrees, or 0/120/240 degrees, among numerous other examples. As an example, there may be two diametrically opposed elongated bag hooks 135. As an alternative to bag hooks, the container 130 may rely on its collar 134 for attachment of the bag, with a top of the bag being folded over the collar 134 and being retained by friction.

Hinged door supports 136 may be defined in the skirt 134A adjacent to the opening 133, for hingedly supporting door doors as explained after that close or open access to an interior of the container 130 from the opening 133, while shutting the bag closed to seal odors into the bag. Hinged door supports 136 may include a pivot(s) and/or pivot hole(s).

Hinged lid support 137 may be defined in the top portion 132 adjacent to an exterior surface of the container 130, for rotatably supporting the lid assembly 140, also to close or open access to an interior of the container 130 from the opening 133. A pivoting of the lid assembly 140 may also expose various components of the device 110. Hinged lid supports 137 may include a pivot(s) and/or pivot hole(s).

A retaining finger 138 may be provided on a side of the top portion 132 opposite the hinged lid support 137 for releasably retaining the lid assembly 40 in the shut portion of FIG. 15. The retaining finger 138 may be of the cantilever type, retaining the hinged lid support 137 by way of elastic deformation biasing.

A guide arm 139 may be provided to project from a top portion 132 of the container 130 into the inner cavity of the container 130, and may slidingly support components of the actuation mechanism 150, as is described hereinafter.

Figure 20:
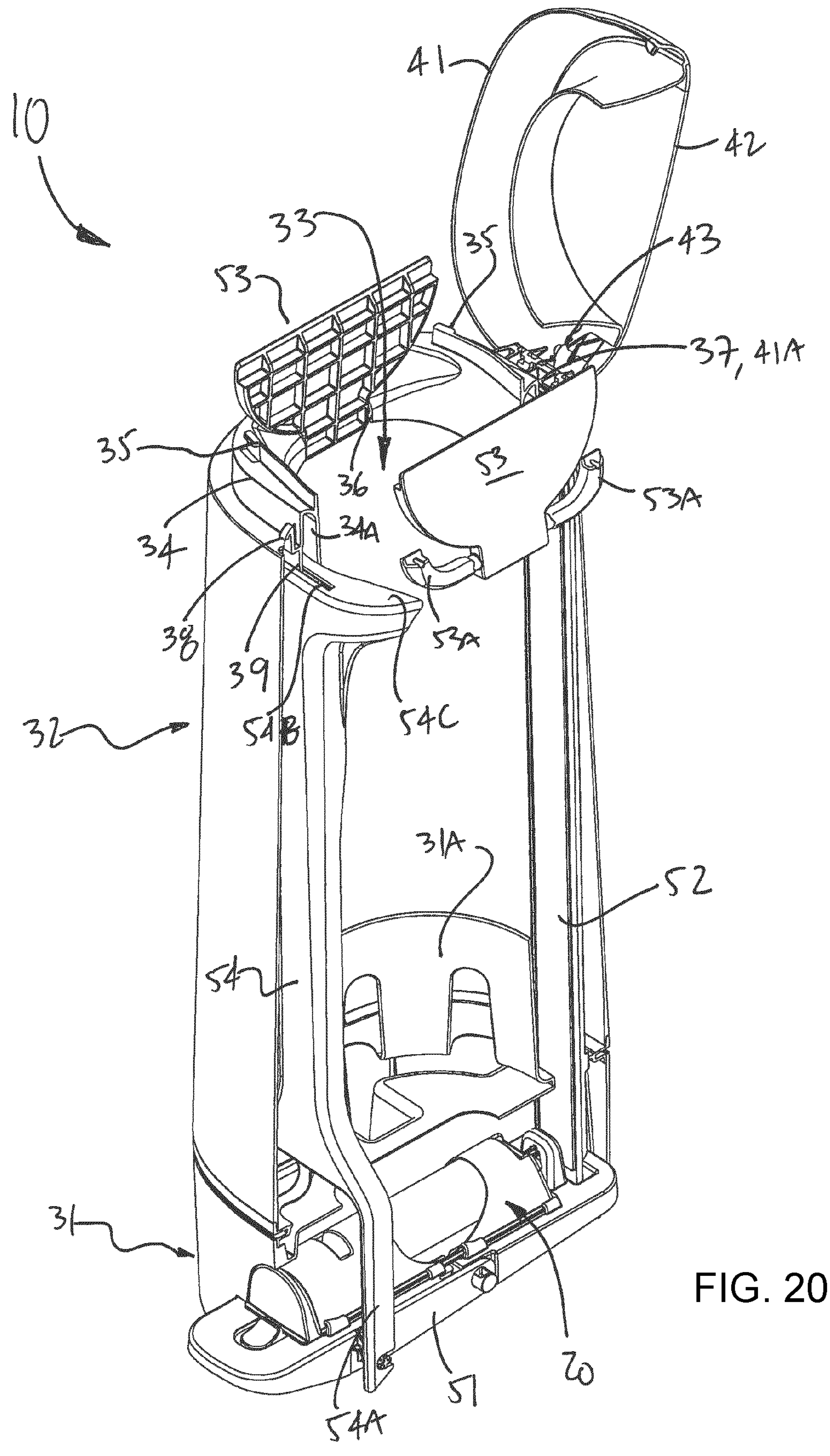
FIG. 20 is a partly sectioned perspective view of the assembly of FIG. 15, in a bag replacement arrangement.

Referring to FIGS. 15 and 20, the lid assembly 140 has an annular base 141. The geometry of the annular base 141 is complementary to that of the upper end of the top portion 132 of the container 130, including the upper annular collar 134. Accordingly, the annular base 141 of the lid assembly 140 is seated on the upper end of the container 130. The annular base 141 may also have a skirt-like body as in FIG. 15, to conceal the and cover the collar 134, in its downwardly opened annular cavity. In the illustrated embodiment, the annular base 141 is connected to hinged lid support 137 so as to pivot, for example from the shut orientation of FIG. 15 to the open orientation of FIG. 20. The annular base 141 has the complementary hinge joint component(s) 141A, such as pivot holes, pivot, etc. The retaining finger 138 collaborates with a tab 141B to keep the annular base 141 in the shut orientation of FIG. 15. A detent may be present to release the interconnection between the retaining finger 138 and the tab 141B. Alternatively, a pull on the annular base 141 may cause a deformation that releases the engagement between the retaining finger 138 and the tab 41B. Other interconnection arrangements are considered such as a press-fit, quick connect system, threading engagement, or the like. The annular base 141 may for instance be pivoted to the open orientation of FIG. 20 to attach or detach a bag from the collar 134.

Figure 22:
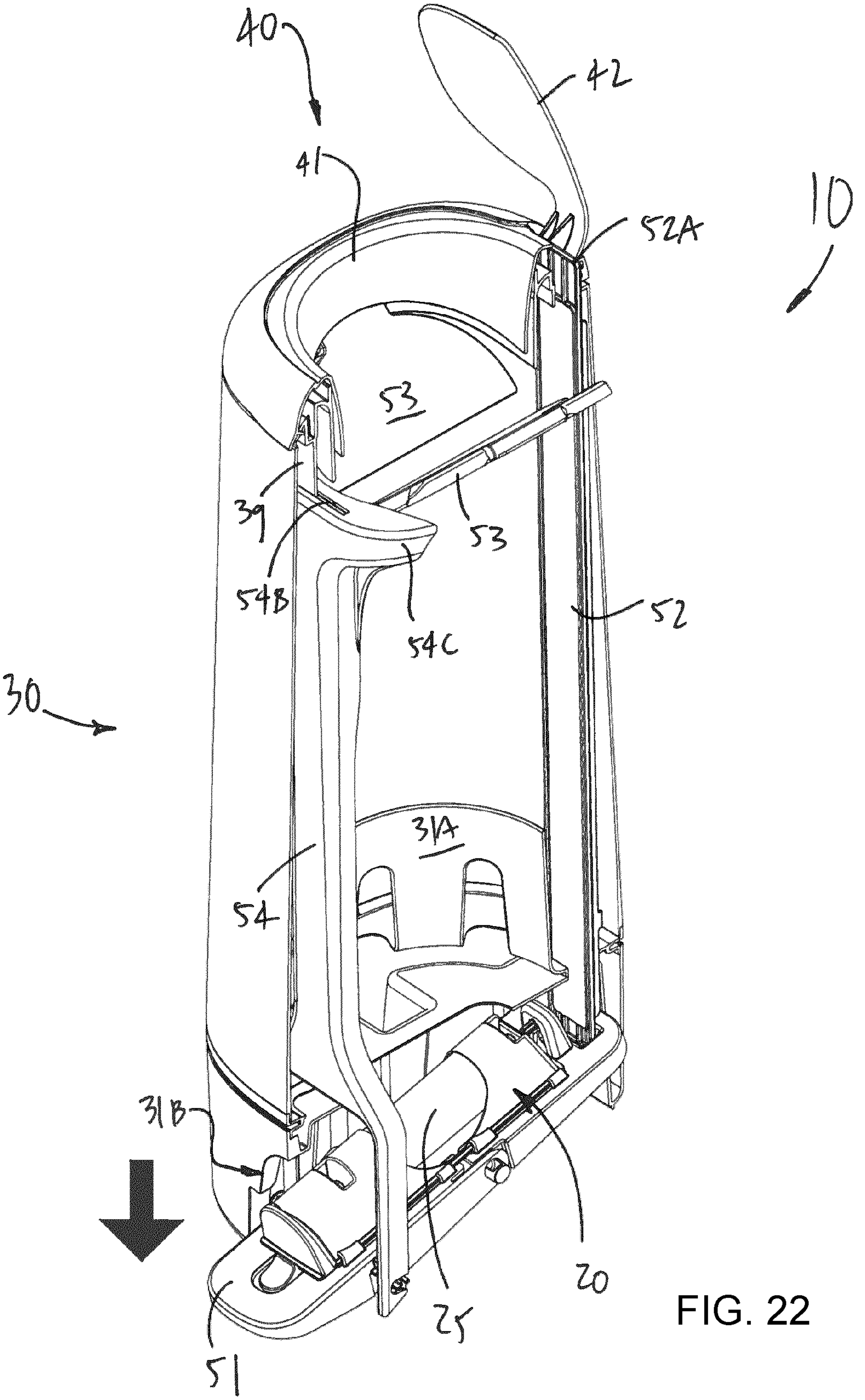
FIG. 22 is a partly sectioned perspective view of the assembly of FIG. 15, in a waste disposal arrangement
Figure 23:
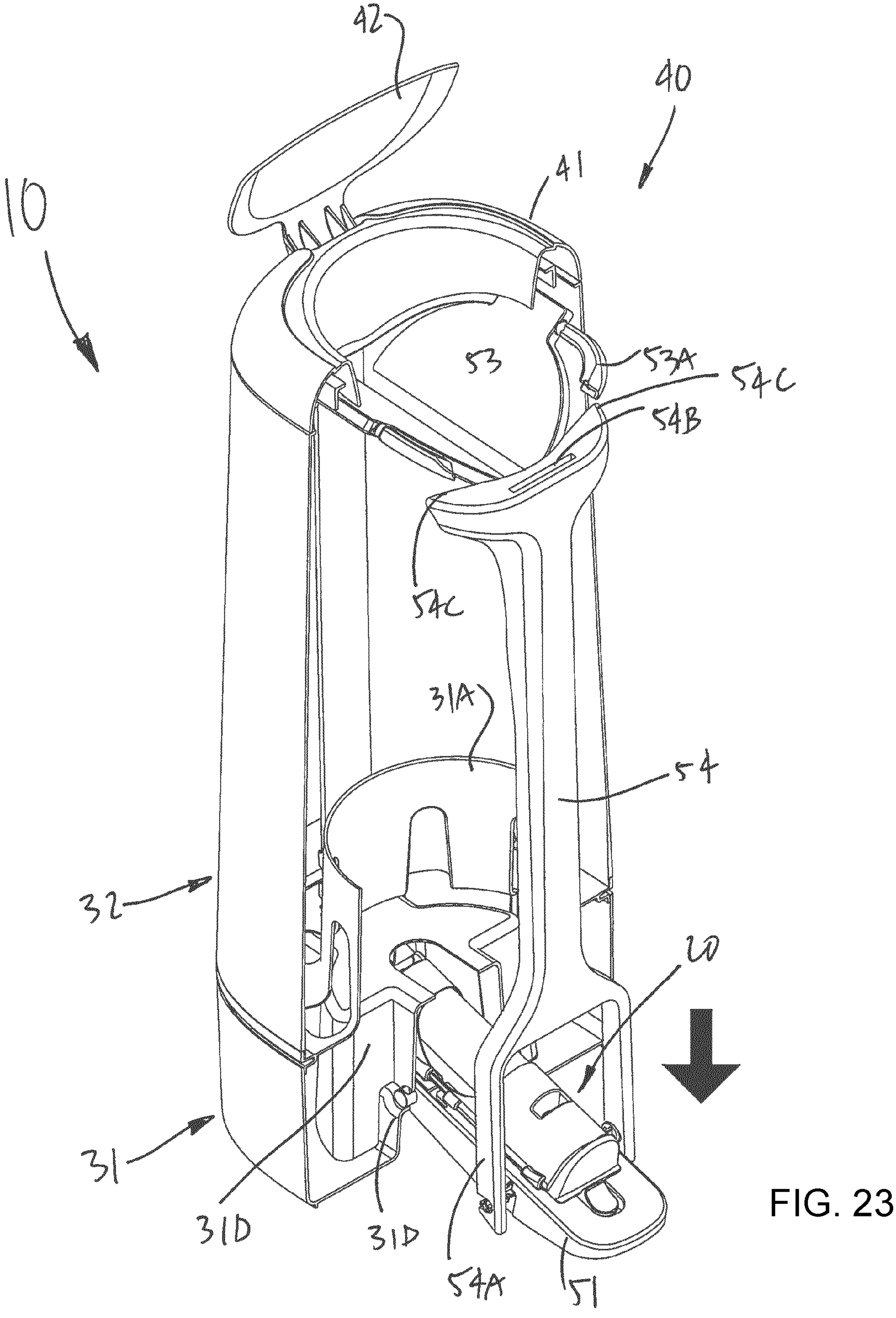
FIG. 23 is a partly sectioned perspective view of the assembly of FIG. 22, from another perspective.
Figure 24:
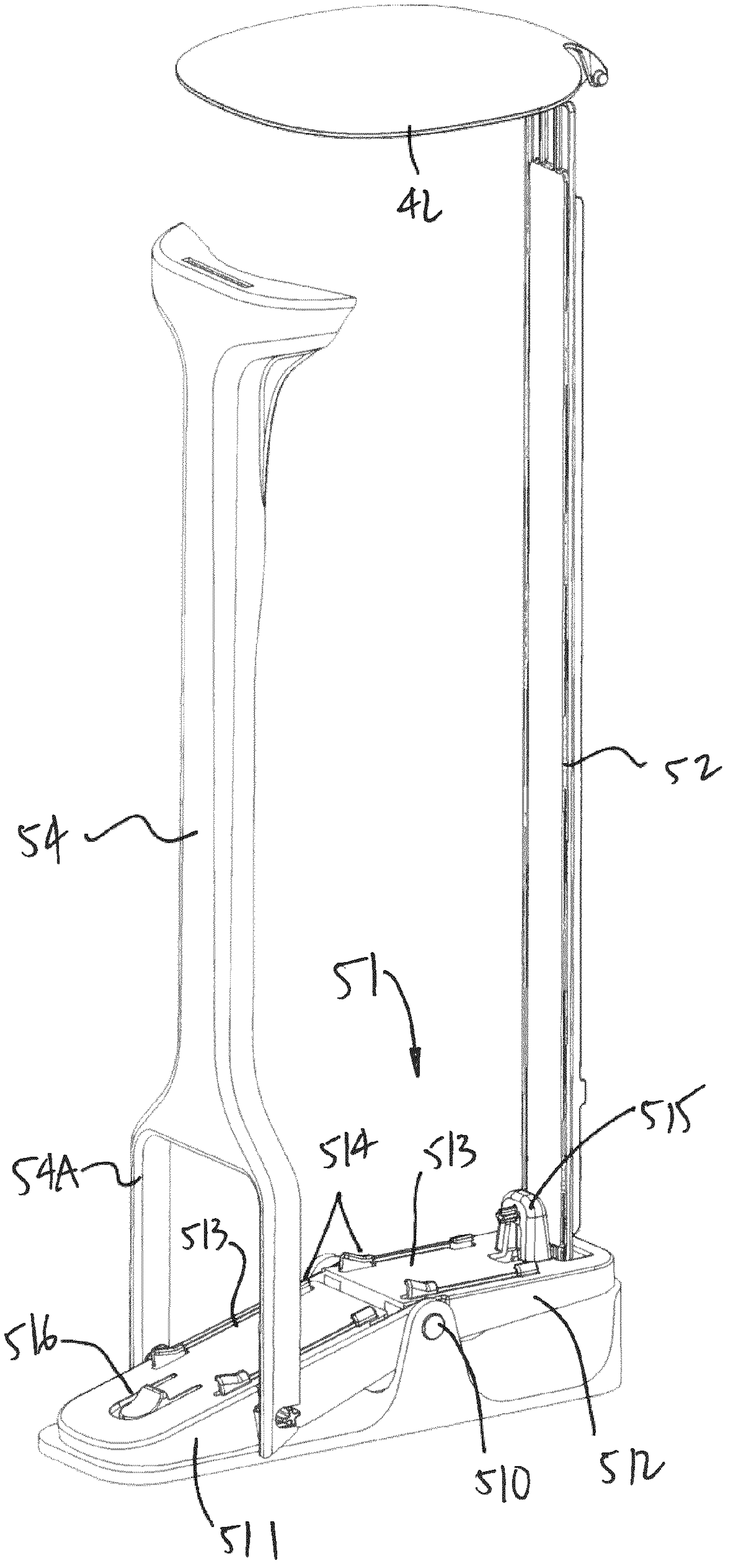
FIG. 24 is a perspective view of a pedal of the waste disposal device of the present disclosure.

A lid 142 is pivotally connected to the annular base 141 by hinge 143. Therefore, the lid 142 may pivot between an opened position, as shown in FIGS. 22 and 23, and a closed position, as shown in FIG. 15. In the closed position, the lid 42 blocks the opening 133. In the opened position, the opening 133 is exposed, whereby a user may throw waste into the bag in the device 110.

Referring to FIGS. 15 and 20-23, the actuation mechanism 150 consists of linkages (i.e., links and joints) interfaced by a user with a pedal 151. The pedal 151 is pivotally connected to the base portion 131 of the container 130. A front portion of the pedal 51 projects outwardly from a front side of the container 130, and is close to the ground, whereby a user may simply press on the exposed portion of the pedal 151, to open the lid 142 of the device 110. The device 110 may be provided with alternative interfaces, like a hand lever or the like. According to an embodiment, there may be a specific interaction between the pedal 151 and the cassette 120, and this will be described in further detail hereinafter, with reference to FIG. 24.

A first link 152 is connected to a rear portion of the pedal 151, inside the container 130. The first link 152 may be connected to structural components in the container 130 such as openings in the base portion 131 and the top portion 132, so as to be restricted to translational movement (i.e., up and down). Accordingly, by pressing downwardly on the front portion of the pedal 151 as shown in FIGS. 22 and 23, the first link 152 moves upwardly. The subsequent release of the pedal 151 may cause the first link 152 to move downwardly, for instance by way of gravity.

Still referring to FIGS. 15 and 20-23, the first link 152 has a lid-pushing end 152A. The lid-pushing end 152A contacts the lid 142 adjacent to the hinge 132. Accordingly, an upward movement of the first link 152 results in the opening of the lid 142 by the pushing action of the end 152A on the lid 142. Similarly, a downward movement of the first link 152 causes the movement of the lid 142 toward the closed position, by the retracting movement of the end 152A.

In addition to transmitting motion of the pedal 151 to the lid 142, the actuation mechanism 150 may also assist doors 153 that seal the bag closed. The doors 153 are pivotally mounted to the hinged door supports 136, by complementary pivot joints components (e.g., pivot(s) and/or pivot hole(s)). Although not shown, biasing members may be present to hold the doors 153 in the normally-closed position of FIG. 15. The doors 153 are sized to come into contact with one another, thereby shutting a bag passing through the opening (e.g., attached to the collar 34). The doors 53 may each have an arm 153A or arms 153A integrally part or rigidly connected to them, such that the arms 153A move concurrently with the doors 153. The arms 153A may have the arcuate shape of the figures so as to be concealed inside the annular cavity of the skirt 134A.

A second link 154 is connected to a front portion of the pedal 151, inside the container 130, for example by way of a fork 154A and pivots. The second link 154 may be operatively connected to structural components in the container 130, such as the guide arm 139 in the top portion 132 received in a slot 154B at a top of the second link 154, so as to be restricted to translational movement (i.e., up and down). Accordingly, by pressing downwardly on the front portion of the pedal 151 as shown in FIGS. 22 and 23, the second link 154 is pulled downwardly. The subsequent release of the pedal 151 may cause the second link 154 to move upwardly, for instance by way of gravity, as the lid 142 causes a countering force on the first link 152.

Still referring to FIGS. 15 and 20-23, the second link 154 has door-pushing ends 154C. The door-pushing ends 154C may contact the arms 153 in a given circumstances. More particularly, when there is no push on the pedal 151, as in FIG. 15, the door-pushing end 154C contact the arms 153A to ensure that the doors 153 are pressed against one another, with the bag closed shut between, such that odors may be blocked from exiting the bag. When the pedal 151 is pressed downwardly as in FIGS. 22 and 23, the door-pushing end 154C are lowered, so as not to impede movements of the doors 153. As mentioned above, when the pedal 151 is pressed downwardly, the lid 142 is raised, thereby exposing the opening 133 and the doors 153. A user may consequently throw away an object. The object's weight may be greater than the biasing action of the spring(s) or like biasing mechanism, whereby the doors 153 temporarily open to let the object(s) through. Once the object is beyond the doors 153 and into the bag, the doors 153 return to the closed position and squeeze the bag between them. Therefore, when the pedal 151 is lowered, the door-pushing end 154C do not interfere with the arms 153A or with the movement of the doors 153. When the pedal 151 is released, the second link 154 moves upwardly, such that the door-pushing end 154C exert a pressure on the doors 153, to ensure that they are forced against one another in the manner shown in FIG. 15.

Figure 21:
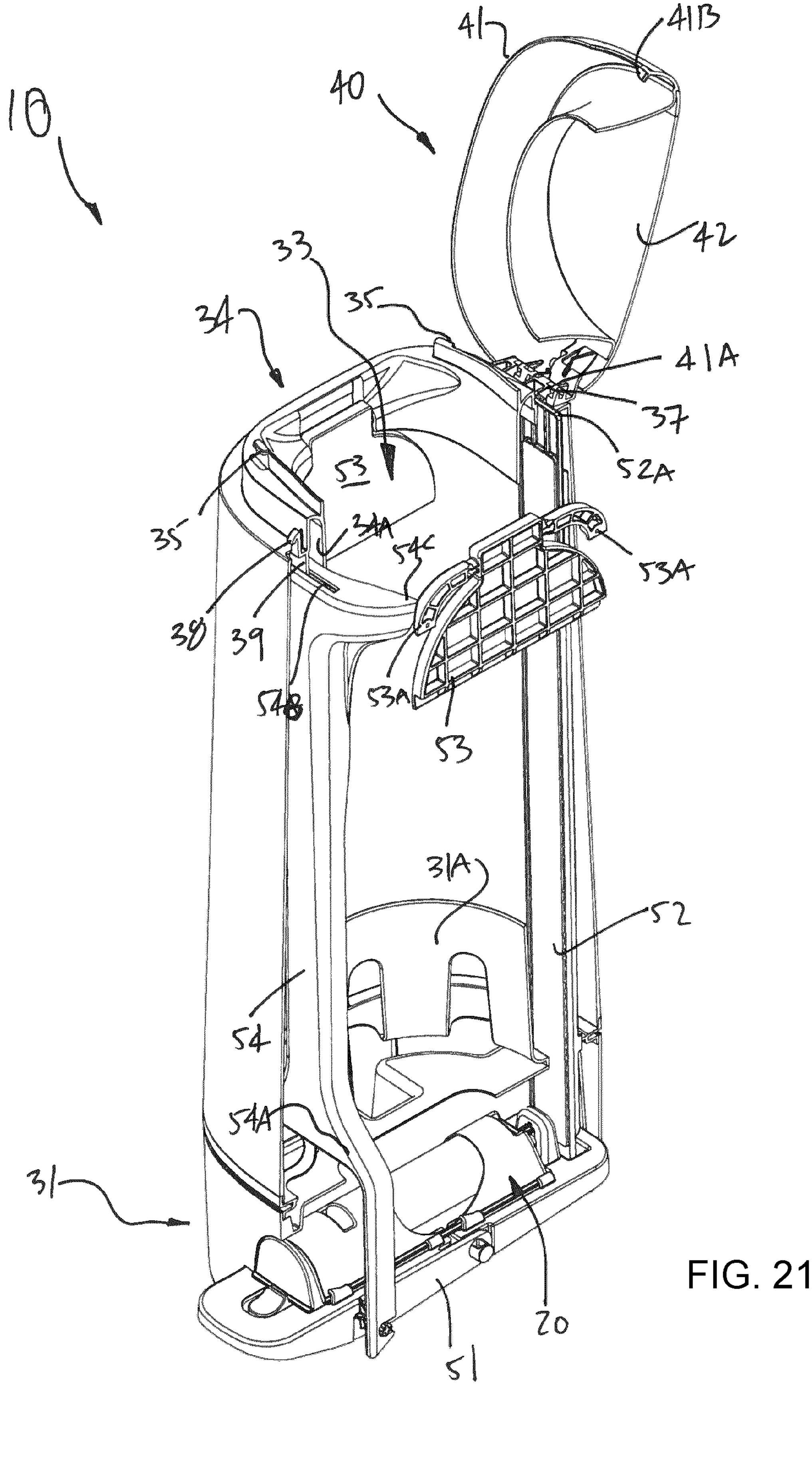
FIG. 21 is a partly sectioned perspective view of the assembly of FIG. 15, in a door blocking arrangement.

Referring to FIG. 21, there is shown a door blocking arrangement, for example employed occasionally by the user when a new cassette 120 is inserted in the device 110. In such an arrangement, the pedal 151 is pressed downwardly, such that the lid 142 is in its open or raised orientation. The door-pushing end 154C are lowered as detailed above when the pedal 151 is pressed downwardly. A user may push the doors 153 inwardly in the manner of FIG. 21. In doing so, the arms 153A will snap by the door-pushing end 154C, and be blocked from returning to the closed position of FIG. 15. As the doors 153 are held open, a user may reach inside the container 30 via the opening 133, to pull a free of the bag roll 125 out of the cassette 120 upwardly, to attach the free end to the hooks 135, with the bag open. Once that is one, a release of the pressure on the pedal 151 will result in a lowering of the annular base 141 and of the lid 142. The second link 152 moves upwardly, whereby the door-pushing ends 54C no longer block the arms 153A. The doors 153 may return to their closed position of FIG. 15, with the bag squeeze between them.

When the bag is filled and needs replacement, the whole lid assembly 140 is pivoted away as in FIG. 20, without pressing on the pedal 151. This exposes the top end of the bag attached to the hooks 135. The top end of the bag is detached from the hooks 135, and may be pulled upwardly. As shown in FIG. 20, the only constraint on the doors 153 is the biasing action. Accordingly, a good upward pull on the bag pivots the doors 153 upwardly as in FIG. 20. The bag may therefore be removed from the container 130 by the upward pull. As the bag is part of the roll 125, the next bag is concurrently pulled up to the level of the collar 134. Once the full bag is detached from the roll 125, the next empty bag in the roll 125 may be attached to the collar 134.

Referring now to FIGS. 24-28, there is illustrated an embodiment of the pedal 151 that may or may not be part of the device 110. The pedal 151 is shown as mounted to a pivot 510 and support that may not resemble the one of the base portion 131 in FIGS. 22 and 23. The pivot 510 and support may have been simplified to focus FIGS. 10-14 on the construction of the pedal 151.

Figure 25:
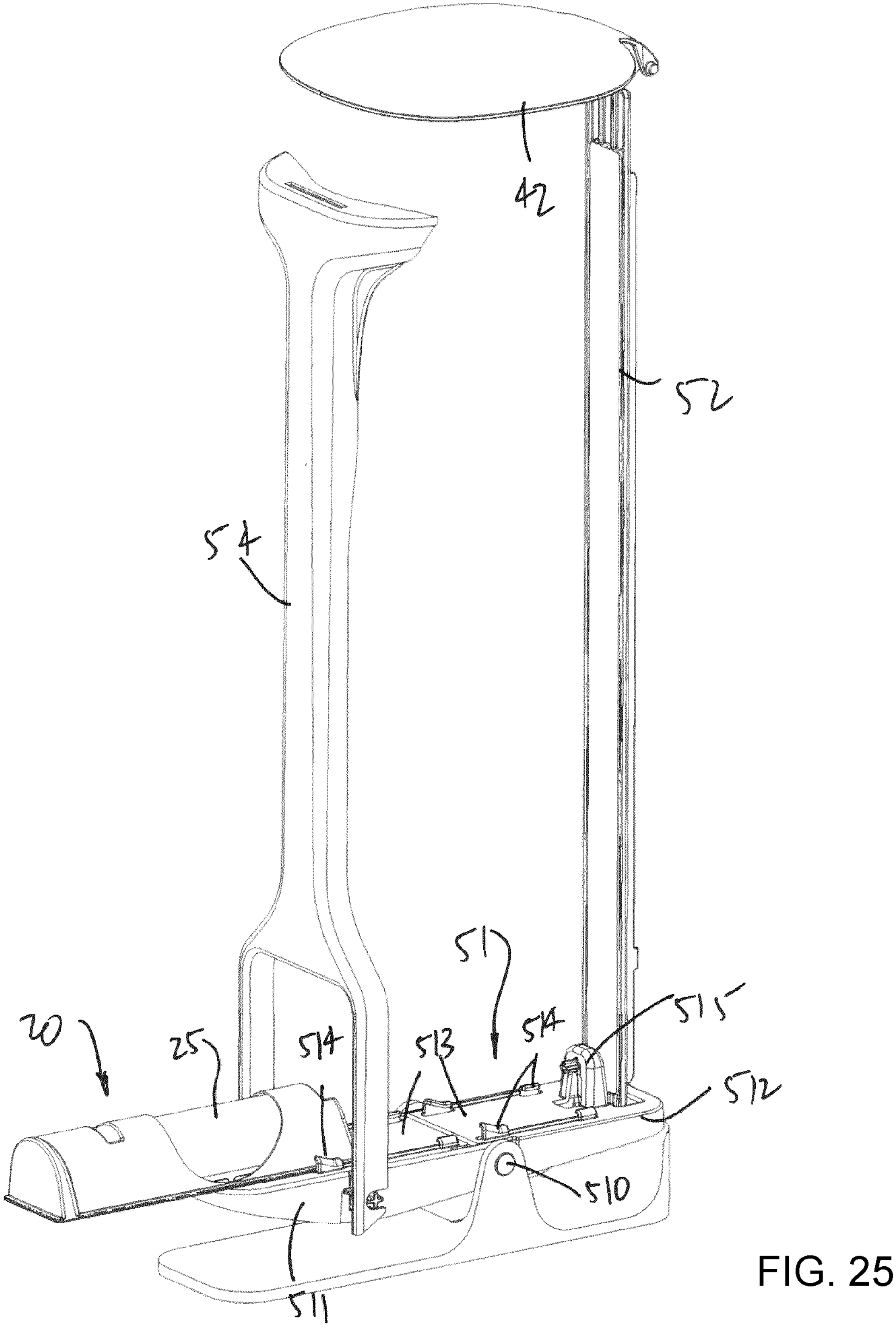
FIG. 25 is a perspective view of the pedal of FIG. 24, with a front pedal member pivoted independently of a rear pedal member.
Figure 26:
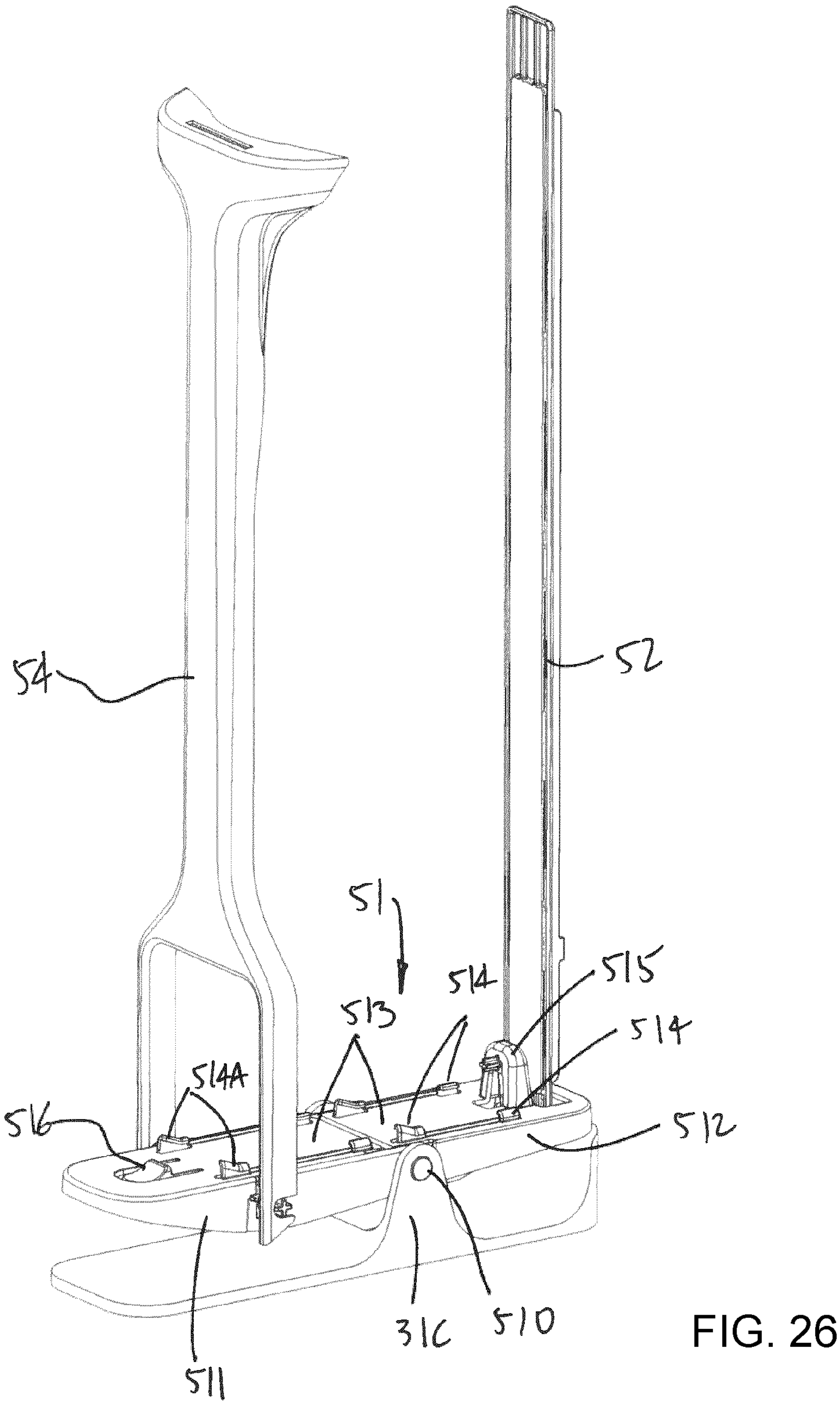
FIG. 26 is a perspective view of the pedal of FIG. 24, with the cassette of FIG. 2 being slid into engagement.

The pedal 151 has a front pedal member 511 and a rear pedal member 512. The front pedal member 511 is the part of the pedal 151 that projects out of the container 130 so as to be pressed by foot. The rear pedal member 512 is concealed inside the container 130 and is connected to the first link 152 to transmit the movement of the pedal 151 to the lid 142 as described above. The front pedal member 511 and the rear pedal member 512 are independently connected to the pivot 510. Therefore, as shown in FIG. 25, a pressure on the front pedal member 511 may result in only the front pedal member 511 rotating, while the rear pedal member 512 does not move.

The front pedal member 511 and the rear pedal member 512 may concurrently define a cassette receiving surface 513. The cassette receiving surface 513 may be shaped as a function of a bottom surface of the cassette 120. In the illustrated embodiment, the cassette receiving surface 513 is generally planar, but rails, channels, etc may be present of the bottom surface of the cassette 120 is shaped complementarily. Brackets 514 project upwardly from the cassette receiving surface 513, and may have an inverted L shape. The brackets 514 are distanced from each other so as to from a guideway for the cassette 120. More particularly, the brackets 514 may receive parts of the rim 126 of the cassette (FIG. 17). In an embodiment, the rim 126 has the pair of straight parallel segments that may be received in the brackets 514. The cassette 120 may therefore be slid into engagement with the pedal 151. In an embodiment, the cassette 120 has its bottom surface laid against the cassette receiving surface 1513, and the straight segments of the rim 126 are inserted into the leading brackets 514A, which may or may not have a greater entry height tapering toward the rear pedal member 512. The leading brackets 514 of the rear pedal member 512 may also have such a shape. In FIGS. 24-28, the leading brackets 514 have a greater entry height with subsequent taper. Accordingly, a sliding joint (a.k.a., a translational joint) is provided between the cassette 120 and the pedal 151. The sliding joint may not be necessary, but in an embodiment the cassette 20 is rigidly connected to the pedal 151 by appropriate connectors, clamps. For example, the cassette 1120 may be bolted, clamps, fastened to the front pedal member 511 and rear pedal member 512 such that a rigid assembly is formed. As shown in FIGS. 22 and 23, the connection between the cassette 120 and the pedal 151 is such that both front pedal member 511 and rear pedal member 512 pivot concurrently. An abutment 515 may be defined on the rear pedal member 512 to bound the position of the cassette 20 on the pedal 151. The abutment 515 may be on the rear pedal member 512 and have a spring as in the figures, or on the front pedal member 511, if present. The head 127 of the cassette 20 may also or alternatively limit the inward movement of the cassette 20. A cantilevered tongue 516 may also project upwardly from the front pedal member 511 to block the cassette 120 onto the pedal 151. The cantilevered tongue 516 may deform elastically to remove the cassette 120.

Figure 27:
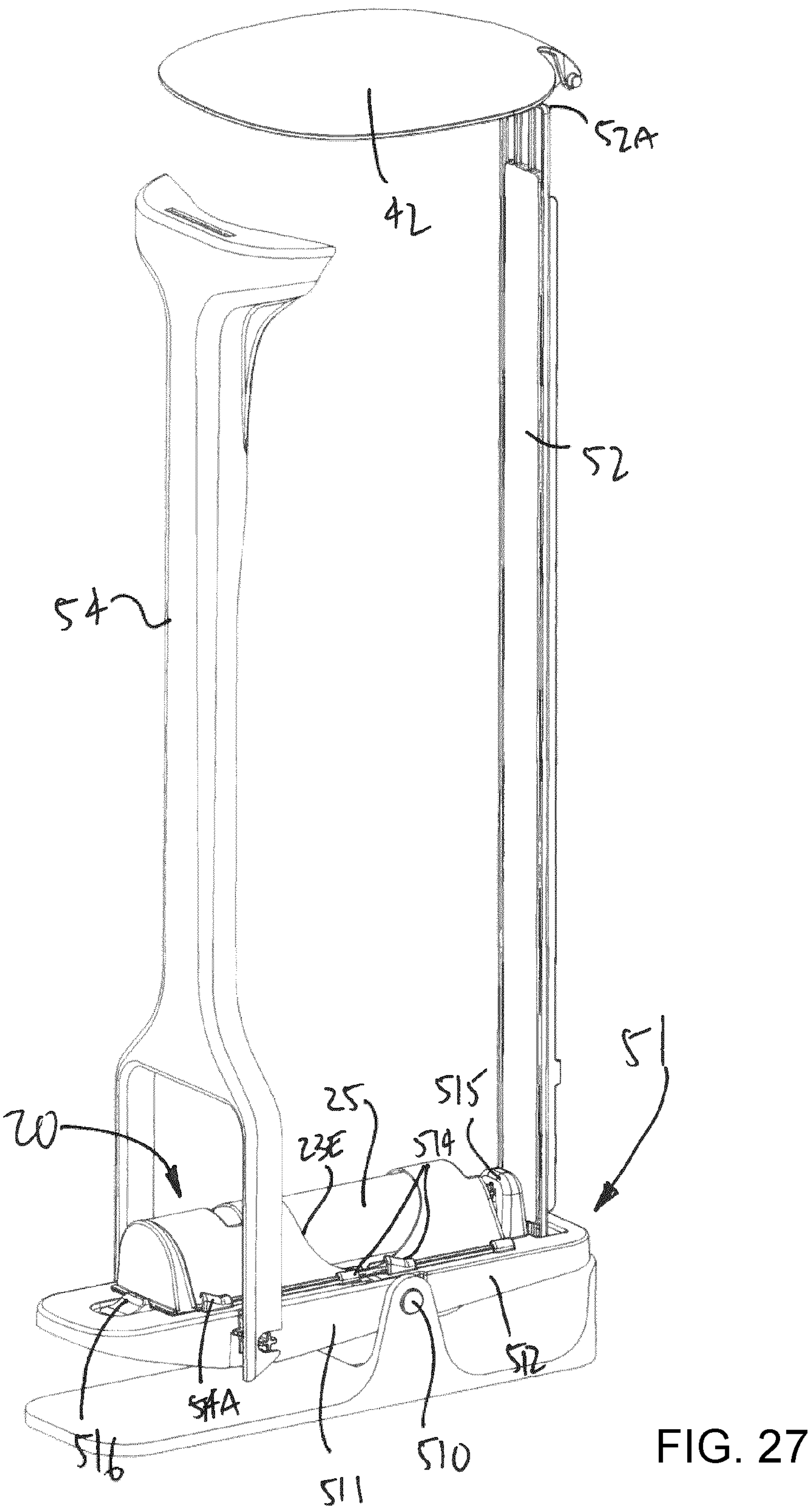
FIG. 27 is a perspective view of the pedal of FIG. 24, with the cassette engaged to the pedal.
Figure 28:
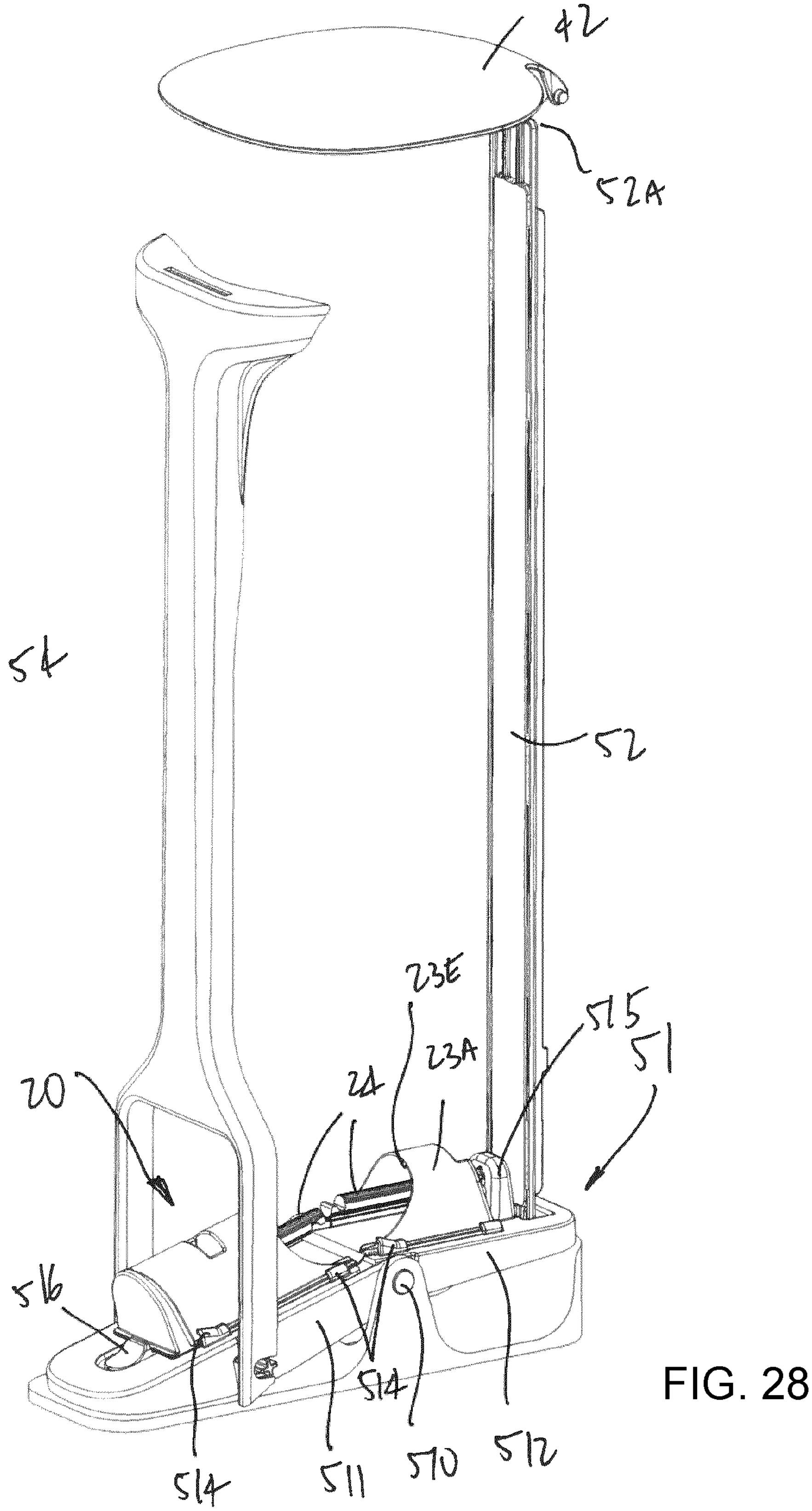
FIG. 28 is a perspective view of the pedal of FIG. 24, with a front pedal member pivoted independently of a rear pedal member when the cassette is emptied.

Thus, when the cassette 120 is on the pedal 151 in the manner shown in FIG. 27, the front pedal member 511 and the rear pedal member 512 move concurrently. The pedal 151 relies on the bracing of the cassette 120 for the front pedal member 511 and the rear pedal member 512 to move together. However, when the shaft 124 splits or collapses, as described above, as it runs out of film, the cassette 120 loses its structural force and may bend. This is shown in FIG. 28, in which it is observed that the cassette's opening 123E overlaps the separation between the front pedal member 511 and the rear pedal member 512. As the weaker portion of the cassette 120 is over the separation, the cassette 120 bends when the front pedal member 511 is pivoted. Consequently, in spite of a pedal actuation by the user, the lid 142 fails to move. This is an indication for the user to change the cassette 120 as the cassette 120 in the device 110 has run out of film/bags. The user may press on the tongue 516 to pull the empty cassette 120 out. A new cassette 120 may then be inserted according to the sequence described above.

Other embodiments include: a different shape for the doors 153; a single one of the doors 153 being movable; a single door 153 being present; the use of EVOH for the tubular film of the roll 125; the use of the device 110 without the cassette 120, with unitary bags instead; the use of the device 110 with a bag roll that is not part of the cassette 120; the use of the cassette in another type of device 110, such as a pail without doors and without the actuation mechanism 150.

The invention claimed is:

1. A waste disposal device comprising:

a container having an opening at a top end, the container defining an inner cavity accessible through the opening, a bag interface at the opening adapted to hold a bag opened at the opening of the container with a closed end of the bag extending in the inner cavity;

a pair of doors pivotally connected to the container to open and close access through the opening and adapted to close off a portion of the bag passing therebetween, the doors being pivotable from a closed position in which the doors meet to close the access through the opening, to a first pivoted position in which the doors are pivoted away from the inner cavity, and wherein at least one of the doors is pivotable to a second pivoted position toward the inner cavity; and an actuation mechanism operatively connected to at least one of the doors to bias the at least one of the doors to the closed position.

2. The waste disposal device according to claim 1, further comprising a lid pivotably mounted to the container to expose or conceal the doors.

3. The waste disposal device according to claim 2, wherein the actuation mechanism has a pedal actuatable by a user, the actuation mechanism comprising a link assembly interfacing the pedal and to the lid to open/close the lid.

4. The waste disposal device according to claim 3, wherein the link assembly blocks at least one of the doors from pivoting to the first pivoted position when the pedal is pressed.

5. The waste disposal device according to claim 3, wherein the link assembly has a first link translating in a generally vertical direction in the inner cavity, the first link having a top pushing end contacting the lid to displace the lid to open access to the opening.

6. The waste disposal device according to claim 5, wherein the first link is pivotally connected to the pedal.

7. The waste disposal device according to claim 5, wherein a second link is connected to the first link by a joint providing a rotational degree of freedom and a translational degree of freedom, the second link being pivotally connected to one of the doors.

8. The waste disposal device according to claim 7, wherein the joint is at least one set of follower and guide slot.

9. The waste disposal device according to claim 5, wherein the first link has a two-pronged end contacting the lid.

10. The waste disposal device according to claim 3, wherein at least one biasing unit biasing the link assembly to a downwardmost position to keep the doors in the closed position.

11. The waste disposal device according to claim 1, wherein the container comprises a top portion and a base portion, the top portion being separated from the base portion for access to the inner cavity of the container.

12. The waste disposal device according to claim 11, wherein the base portion defines at least one cassette compartment adapted to receive a cassette dispending a roll of bags.

13. The waste disposal device according to claim 12, further including at least one of the cassette.

14. The waste disposal device according to claim 13, wherein the base portion has a releasable connection for the cassette in the compartment.

15. The waste disposal device according to claim 1, wherein a periphery of the opening has an abutment blocking one of the doors from moving to the second pivoted position.

16. The waste disposal device according to claim 15, further comprising a biasing member biasing one of the doors toward the closed position from the first pivoted position.

17. The waste disposal device according to claim 1, wherein the bag interface is at least one collar.

18. The waste disposal device according to claim 17, comprising at least one hook on the at least one collar and facing outwardly.

19. The waste disposal device according to claim 17, comprising two of said collar on opposite sides of the opening.

* * * * *